(12) United States Patent
Inoue et al.

(10) Patent No.: US 6,830,533 B2
(45) Date of Patent: Dec. 14, 2004

(54) APPARATUS AND METHOD FOR CONTROLLING TRANSMISSION RATIO OF TOROIDAL-TYPE CONTINUOUSLY VARIABLE TRANSMISSION UNIT FOR CONTINUOUSLY VARIABLE TRANSMISSION APPARATUS

(75) Inventors: Eiji Inoue, Kanagawa (JP); Takashi Imanishi, Kanagawa (JP); Toshiro Toyoda, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/418,089

(22) Filed: Apr. 18, 2003

(65) Prior Publication Data

US 2003/0216216 A1 Nov. 20, 2003

(30) Foreign Application Priority Data

Apr. 18, 2002 (JP) .................................. P. 2002-116185
Nov. 26, 2002 (JP) .................................. P. 2002-341600
Mar. 4, 2003 (JP) .................................. P. 2003-056681

(51) Int. Cl.$^7$ ............................................ B60K 41/12
(52) U.S. Cl. ........................ 477/37; 477/50; 477/68 B
(58) Field of Search ............................. 477/37–38, 42, 477/50, 68, 121, 156

(56) References Cited

U.S. PATENT DOCUMENTS 3,006,206 A * 10/1961 Kelley et al. .................. 476/2
4,961,315 A * 10/1990 Ishikawa et al. ............... 60/327
5,643,132 A * 7/1997 Inoue ............................ 476/10
5,683,326 A * 11/1997 Inoue ............................ 476/10
6,251,039 B1 6/2001 Koga
6,533,702 B1 * 3/2003 Asyama et al. ............... 477/45
6,671,601 B2 * 12/2003 Abiru ........................... 701/51

FOREIGN PATENT DOCUMENTS

| JP | 10-103461 | 4/1998 |
| JP | 2000-220719 | 8/2000 |
| JP | 2001-65676 | 3/2001 |

* cited by examiner

Primary Examiner—Tisha D Lewis
(74) Attorney, Agent, or Firm—Sughrue Mion, PLLC

(57) ABSTRACT

A control apparatus for controlling transmission ratio of a toroidal-type continuously variable transmission unit of a continuously variable transmission apparatus, the continuously variable transmission apparatus has: a toroidal-type continuously variable transmission unit, which changes a transmission ratio between pair of disks by shifting trunnions in the axial direction of pivot shafts by using actuators; and, a differential unit of a gear type including a combination of a plurality of gears, the control apparatus having: rotation speed control unit; transmission ratio setting unit; oil pressure measuring unit; and, transmission ratio correcting unit operating in response to a deviation of a pressure difference between a measured value by the oil pressure measuring unit and a target value of a torque passing through the toroidal-type continuously variable transmission unit, and adjusting the transmission ratio of the toroidal-type continuously variable transmission unit so as to eliminate the deviation.

16 Claims, 12 Drawing Sheets

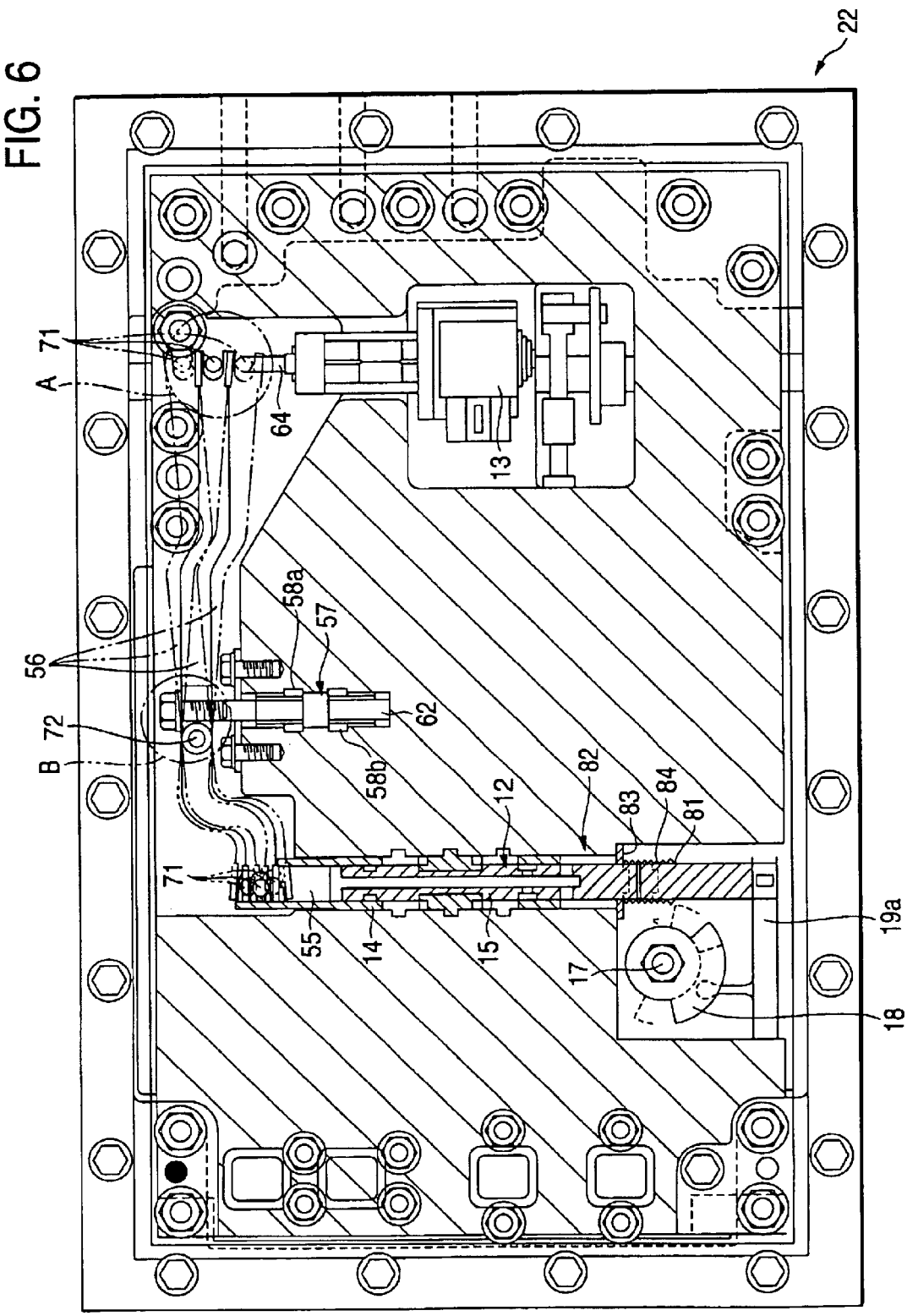

APPARATUS AND METHOD FOR CONTROLLING TRANSMISSION RATIO OF TOROIDAL-TYPE CONTINUOUSLY VARIABLE TRANSMISSION UNIT FOR CONTINUOUSLY VARIABLE TRANSMISSION APPARATUS

BACKGROUND OF THE INVENTION

1. Field of the Invention

The present invention relates to a high-precision control for the transmission ratio of a toroidal-type continuously variable transmission disposed in a continuously variable transmission for using an automatic transmission apparatus for a vehicle.

2. Description of the Related Art

As an automatic transmission apparatus for a car, use of such a toroidal-type continuously variable transmission unit as shown in FIGS. 13 to 15 has been studied and enforced in part of the car industry. This is referred to as a toroidal-type continuously variable transmission unit of a double cavity type, in which two input side disks 2, 2 are respectively supported on the peripheries of the two end portions of an input shaft 1 through ball splines 3, 3. Therefore, the two input disks 2, 2 are supported in such a manner that they are concentric with each other and can be rotated in synchronization with each other. Also, an output gear 4 is supported on the periphery of the middle portion of the input shaft 1 in such a manner that it can be rotated with respect to the input shaft 1. And, two output side disks 5, 5 are respectively spline engaged with the two end portions of a cylindrical portion formed in the central portion of the output gear 4. Thus, the two output side disks 5, 5 can be rotated together with the output gear 4 and in synchronization with each other.

Also, between the input side disks 2, 2 and output side disks 5, 5, there are interposed and held a plurality of (normally, two or three) power rollers 6, 6, respectively. The power rollers 6, 6 are rotatably supported on the inner surfaces of their associated trunnions 7, 7 through support shafts 8, 8 and a plurality of rolling bearings. The trunnions 7, 7 can be swung (inclined) about and shifted with respect to pivot shafts 9, 9 which are disposed on the longitudinal-direction (in FIGS. 13 and 15, the vertical direction; and, in FIG. 14, the front and back direction) two end portions of their associated trunnions 7, 7 in such a manner that they are concentric with each other. The operation to incline the trunnions 7, 7 is executed by shifting these trunnions 7, 7 in the axial direction of the pivot shafts 9, 9 using actuators 10, 10 each of an oil pressure (hydraulic) type; and, the inclination angles of all of the trunnions 7, 7 are to be synchronized with one another not only in an oil pressure manner but also in a mechanical manner.

That is, in the operation to change a transmission ratio between the input shaft 1 and output gear 4, when changing the inclination angles of the trunnions 7, 7, the trunnions 7, 7 are respectively shifted in the mutually opposite directions, using the actuators 10, 10; for example, the power roller 6 on the right side in FIG. 15 is shifted to the lower side in FIG. 15, while the power roller 6 on the left side in FIG. 15 is shifted to the upper side in FIG. 15. This changes the direction of a tangential-direction force acting on the contact portions between the peripheral surfaces of the power rollers 6, 6 and the inner surfaces of the input side and output side disks 2, 2, 5, 5 (that is, a side slip phenomenon occurs in the contact portions). And, due to this change in the direction of the tangential-direction force, the trunnions 7, 7 are respectively swung (inclined) in the mutually opposite directions about the pivot shafts 9, 9 pivotally supported on support plates 11, 11. This changes the contact positions between the peripheral surfaces of the power rollers 6, 6 and the inner surfaces of the input side and output side disks 2, 5, thereby changing the rotation transmission ratio between the input shaft 1 and output gear 4.

Supply of pressure oil with respect to the actuators 10, 10 is executed using a single transmission ratio control valve 12 regardless of the number of the actuators 10, 10; and, the motion of any one of the trunnions 7 is fed back to the transmission ratio control valve 12. The transmission ratio control valve 12 includes not only a sleeve 14 to be shifted in the axial direction (in FIG. 13, in the front and backdirection; and, in FIG. 15, in the right and left direction) by a stepping motor 13, but also a spool 15 fitted and mounted into the inside-diameter side of the sleeve 14 so as to be shiftable in the axial direction. Also, there are disposed rods 17, 17 which are respectively used to connect the trunnions 7, 7 to the pistons 16, 16 of the actuators 10, 10; and, to the end portion of the rod 17 of any one of the trunnions 7, there is fixed a precess cam 18 and, through the precess cam 18 and a link arm 19, there is formed a feedback mechanism which is used to transmit the motion of the rod 17, that is, the composite value of the axial-direction shift amount and the rotation-direction shift amount to the spool 15. Also, between the trunnions 7, 7, there is provided a synchronizing cable 63; and, the synchronous cable 63 is used to mechanically synchronize the inclination angles of the trunnions 7, 7 with one another.

When switching the transmission condition, using the stepping motor 13, the sleeve 14 is shifted by a given amount to thereby open the flow passage of the transmission ratio control valve 12. As a result of this, pressure oil is fed into the actuators 10, 10 in a given direction, so that the actuators 10, 10 are allowed to shift the trunnions 7, 7 in a given direction respectively. That is, as the pressure oil is fed into the actuators 10, 10, while the trunnions 7, 7 are being shifted in the axial direction of their associated pivot shafts 9, 9, the trunnions are swung about these pivot shafts 9, 9 respectively. And, the motion (the shifting motion in the axial direction and in the swinging direction) of any one of the trunnions 7 is transmitted to the spool 15 through the precess cam 18 fixed to the end portion of the rod 17 and through the link arm 19, then the spool 15 is shifted in the axial direction. Due to this, in a state where the above trunnion 7 is shifted a given amount, the flow passage of the transmission ratio control valve 12 is closed to thereby stop the supply of the pressure oil to the respective actuators 10, 10. Therefore, the axial-direction and swinging-direction shifting amounts of the respective trunnions 7, 7 provide the amounts that correspond to the shifting amount of the sleeve 14 caused by the stepping motor 13.

When putting the above-structured toroidal-type continuously variable transmission unit into operation, one (in FIGS. 13 and 14, the left one) of the input side disks 2 is driven and rotated through such a pressing device 21 of a loading cam type or an oil pressure type as shown in FIGS. 13 and 14, using a drive shaft 20 connected to a power source such as an engine. As a result of this, the pair of input side disks 2, 2 respectively supported on the two end portions of the input shaft 1, while being pressed in their mutually approaching directions, are rotated in synchronization with each other. And, the rotational movements of the input side disks 2, 2 are transmitted through the power rollers 6, 6 to the output side disks 5, 5; and, these rotational movements are then taken out from the output gear 4.

When the power is transmitted from the input side disks 2, 2 to the output side disks 5, 5, with generation of the frictional movements in the contact portions (traction portions) between the peripheral surfaces of the power rollers 6, 6 supported on the inner surfaces of the trunnions 7, 7 and the inner surfaces of the respective disks 2, 5, to these trunnions 7, 7, there is applied a force which goes in the axial directions of the pivot shafts 9, 9 respectively disposed on the two end portions of their associated trunnions 7, 7. This force is referred to as a so called 2 Ft, the magnitude of which is proportional to the torque that is transmitted from the input side disks 2, 2 to the output side disks 5, 5 (or from the output side disk 5, 5 to the input side disks 2, 2). And, such force 2 Ft is supported by the actuators 10, 10. Therefore, when the toroidal-type continuously variable transmission unit is in operation, a pressure difference between a pair of oil pressure chambers 54a, 54b existing on the two sides of the pistons 16, 16 respectively constituting their associated actuators 10, 10 is proportional to the magnitude of the force 2 Ft.

Now, let us assume that the rotation speed between the input shaft 1 and output gear 4 is changed. Firstly, to reduce the rotation speed between the input shaft 1 and output gear 4, the trunnions 7, 7 are respectively shifted in the axial directions of their associated pivot shafts 9, 9 and are swung to such positions as shown in FIG. 14, using the actuators 10, 10. And, the peripheral surfaces of the power rollers 6, 6, as shown in FIG. 14, are respectively contacted with the near-to-center portions of the inner surfaces of the input side disks 2, 2 and the near-to-outer-periphery portions of the inner surfaces of the output side disks 5, 5. On the other hand, to increase the rotation speed between the input shaft 1 and output gear 4, the trunnions 7, 7 are swung in the opposite direction to the direction shown in FIG. 14; and, the trunnions 7, 7 are respectively inclined in such a manner that the peripheral surfaces of the power rollers 6, 6, oppositely to the state shown in FIG. 14, are respectively contacted with the near-to-outer-periphery portions of the inner surfaces of the input side disks 2, 2 and the near-to-center portions of the inner surfaces of the output side disks 5, 5. In case where the inclination angle of the trunnions 7, 7 is set in the intermediate between the above two cases, there can be obtained an intermediate transmission ratio (speed ratio) between the input shaft 1 and output gear 4.

Further, when incorporating the above-structured and -operated toroidal-type continuously variable transmission unit into a continuously variable transmission for an actual car, it has been conventionally proposed to construct a continuously variable transmission apparatus by combining the present toroidal-type continuously variable transmission unit with a differential unit of a gear type such as a planetary gear mechanism. Here, FIG. 16 shows, of the thus-conventionally proposed continuously variable transmission apparatus, a continuously variable transmission apparatus which is disclosed in U.S. Pat. No. 6,251,039B1. This continuously variable transmission apparatus is composed of a toroidal-type continuously variable transmission unit 22 and a planetary-gear-type transmission unit 23. The toroidal-type continuously variable transmission unit 22 comprises an input shaft 1, a pair of input side disks 2, 2, an output side disk 5a, and a plurality of power rollers 6, 6. In the illustrated example, the output side disk 5a has a structure in which the outer surfaces of a pair of output side disks are butted against each other to thereby provide an integral output side disk.

Also, the planetary-gear-type transmission unit 23 includes a carrier 24 connected and fixed to the input shaft 1 and one (in FIG. 16, the right-side) input side disk 2. On the diameter-direction middle portion of the carrier 24, there is rotatably supported a first transmission shaft 26 on the two end portions of which planetary gear elements 25a, 25b are respectively fixedly disposed. Also, there is rotatably supported a second transmission shaft 28 on the two end portion of which sun gears 27a, 27b are respectively fixedly disposed on the opposite side of the input shaft 1, with the carrier 24 between the second transmission shaft 28 and the input shaft 1; and, the second transmission shaft 28 is disposed concentrically with the input shaft 1 and can be rotated. And, the planetary gear elements 25a, 25b are respectively meshingly engaged with a sun gear 30 fixedly disposed on the leading end portion (in FIG. 16, the right end portion) of a hollow rotary shaft 29 the base end portion (in FIG. 16, the left end portion) of which is connected to the output side disk 5a, and the sun gear 27a fixedly disposed on one end portion (in FIG. 16, the left end portion) of the second transmission shaft 28. Also, one (in FIG. 16, the left-side) planetary gear element 25a is meshingly engaged through another planetary gear element 31 with a ring gear 32 which is rotatably disposed on the periphery of the carrier 24.

On the other hand, planetary gear elements 34a, 34b are rotatably supported on a second carrier 33 disposed on the periphery of the sun gear 27b fixedly disposed on the other end portion (in FIG. 16, the right end portion) of the second transmission shaft 28. By the way, the second carrier 33 is fixedly disposed on the base end portion (in FIG. 16, the left end portion) of an output shaft 35 which is disposed concentrically with the input shaft 1 and second transmission shaft 28. Also, the planetary gear elements 34a, 34b are meshingly engaged with each other; and, at the same time, one planetary gear element 34a is meshingly engaged with the sun gear 27b, while the other planetary gear element 34b is meshingly engaged with a second ring gear 36 which is rotatably disposed on the periphery of the second carrier 33. Further, the ring gear 32 and second carrier 33 can be engaged with and removed from each other using a low-speed clutch 37, while the second ring gear 36 and a fixed portion such as a housing can be engaged with and removed from each other using a high-speed clutch 38.

In the case of the above-structured continuously variable transmission shown in FIG. 16, in a so called low-speed mode condition in which the low-speed clutch 37 is connected and the connection of the high-speed clutch 38 is cut off, the power of the input shaft 1 is transmitted through the ring gear 32 to the output shaft 35. And, by changing the transmission ratio of the toroidal-type continuously variable transmission unit 22, the transmission ratio of the whole of the continuously variable transmission apparatus, that is, the transmission ratio between the input shaft 1 and output shaft 35 can be changed. In such low-speed mode condition, the transmission ratio of the whole of the continuously variable transmission apparatus varies infinitely. That is, by controlling the transmission ratio of the toroidal-type continuously variable transmission unit 22, while the input shaft 1 is left rotating in one direction, the rotation state of the output shaft 35 can be switched from the forward rotation state thereof over to the backward rotation state or vice versa with the stop state between them.

By the way, when increasing the speed in such low-speed mode condition or in the constant-speed running operation in such low-speedmode condition, the torque that passes through the toroidal-type continuously variable transmission unit 22 is applied from the input shaft 1 through the carrier 24, first transmission shaft 26, first sun gear 30 and hollow rotary shaft 29 to the output side disk 5a; and, the torque is further applied from the output side disk 5a through the power rollers 6, 6 to the respective input side disks 2, 2. That is, in the speed increasing condition and in the constant-speed running operation, the torque passing through the toroidal-type continuously variable transmission unit 22 circulates in a direction where the input side disks 2, 2 receive the torque from the power rollers 6, 6.

On the other hand, in a so called high-speed mode condition in which the connection of the low-speed clutch 37 is cut off and the high-speed clutch 38 is connected, the power of the input shaft 1 is transmitted through the first and second transmission shafts 26, 28 to the output shaft 35. And, by changing the transmission ratio of the toroidal-type continuously variable transmission unit 22, the transmission ratio of the whole of the continuously variable transmission apparatus can be changed. In this case, as the transmission ratio of the toroidal-type continuously variable transmission unit 22 increases, the transmission ratio of the whole of the continuously variable transmission apparatus increases.

By the way, when increasing the speed in such high-speed mode condition or in the constant-speed running operation in such high-speed mode condition, the torque passing through the toroidal-type continuously variable transmission unit 22 is applied in a direction where the input side disks 2, 2 apply the torque to the power rollers 6, 6.

For example, in the case of a continuously variable transmission apparatus having such a structure as shown in FIG. 16 and capable of realizing a so called infinite transmission ratio in which the output shaft 35 can be stopped while leaving the input shaft 1 rotating, not only from the view point of securing the durability of the toroidal-type continuously variable transmission unit 22 but also from the view point of securing the easy running operation of the car, it is important to maintain the torque applied to the toroidal-type continuously variable transmission unit 22 at a proper value in a state where the transmission ratio is set extremely large. The reason for this is as follows: that is, as can be seen clearly from the relationship [rotation drive force=rotation speed×torque], in a state where the transmission ratio is extremely large and the output shaft 35 stops or rotates at an extremely low speed while the input shaft 1 remains rotating, the torque passing through the toroidal-type continuously variable transmission unit 22 is large when compared with the torque applied to the input shaft 1. For this reason, in order to secure the durability of the toroidal-type continuously variable transmission unit 22 without increasing the size of the toroidal-type continuously variable transmission unit 22, it is necessary to control the torque so strictly that it is limited to the above-mentioned proper value. Specifically, in order to be able to stop the output shaft 35 while reducing the torque input to the input shaft 1 as much as possible, it is necessary to control the parts including the drive source.

Also, in a state where the transmission ratio is extremely large, even in case where the transmission ratio of the toroidal-type continuously variable transmission unit 22 varies slightly, the torque applied to the output shaft 35 varies greatly. For this reason, in case where the control of the transmission ratio of the toroidal-type continuously variable transmission unit 22 is not executed strictly, there is a possibility that a strange feeling can be given to the driver of the car or the driver can feel it difficult to control the car running operation. For example, in the case of an automatic transmission apparatus for a car, in the car stopping time, while applying the brakes, the driver maintains the car stopping state. In such condition, in case where the transmission ratio of the toroidal-type continuously variable transmission unit 22 is not controlled strictly but a great torque is applied to the output shaft 35, in the car stopping time, there increases the force that is necessary to step down the brakes, which increases the fatigue of the driver. On the other hand, in case where the transmission ratio of the toroidal-type continuously variable transmission unit 22 is not controlled strictly but a torque applied to the output shaft 35 is too small, there is a possibility that the car cannot be started smoothly or the car can back when starting in an uphill slope. Therefore, in an extremely low-speed running time, not only the torque to be transmitted from the drive source to the input shaft 1 must be controlled but also the transmission ratio of the toroidal-type continuously variable transmission unit 22 must be controlled strictly.

In view of the above, in JP-A-10-103461, there is disclosed a structure in which, by controlling directly a pressure difference in an oil-pressure-type (hydraulic) actuator portion for shifting trunnions, the torque passing through the toroidal-type continuously variable transmission unit can be restricted. Also, in JP-A-2001-65676, there are disclosed a structure and a method for controlling the transmission ratio of the toroidal-type continuously variable transmission unit.

In the case of the above structure disclosed in JP-A-10-103461, since the torque is controlled only by the above-mentioned pressure difference, it is difficult to stop the trunnions just when the torque passing through the toroidal-type continuously variable transmission unit coincides with the torque target value. Specifically, because the shifting amounts of the trunnions for controlling the torque become large, there can easily occur a so called over-shoot phenomenon (and further a hunting phenomenon resultant from the over-shoot phenomenon) in which the trunnions do not stop but keep on shifting as they are just when the torque passing through the toroidal-type continuously variable transmission unit coincides with the torque target value, so that the control of the torque passing through the toroidal-type continuously variable transmission unit cannot be stabilized.

Especially, like the ordinary half-toroidal-type continuously variable transmission shown in FIGS. 13 and 14, in the case of a toroidal-type continuously variable transmission unit 22 not having a so called cast angle in which the directions of the pivot shafts 9, 9 respectively disposed on the two end portions of the trunnions 7, 7 are perpendicular to the directions of the center axes of the input side and output side disks 2, 5, the above-mentioned over-shoot phenomenon is easy to occur. On the other hand, like an ordinary full-toroidal-type continuously variable transmission, in the case of a structure having a cast angle, there acts a force going in a direction to bring an end to the over-shoot phenomenon; and, therefore, even in the case of the structure disclosed in the above-cited JP-A-10-103461, it is believed that the torque can be controlled sufficiently.

SUMMARY OF THE INVENTION

The present invention aims at eliminating the above drawbacks found in the conventional method and apparatus for controlling the torque and thus the transmission ratio of a toroidal-type continuously variable transmission unit. Accordingly, it is an object of the invention to provide a control method and a control apparatus which, even when used in a continuously variable transmission apparatus incorporating therein a toroidal-type continuously variable transmission unit such as an ordinary half-toroidal-type continuously variable transmission unit not having a cast angle, are capable of controlling strictly the torque that passes through the toroidal-type continuously variable transmission unit.

In attaining the above object, according to a first aspect of the invention, there is provided a control apparatus for controlling transmission ratio of a toroidal-type continuously variable transmission unit of a continuously variable transmission apparatus, the continuously variable transmission apparatus, having: a toroidal-type continuously variable transmission unit including: an input shaft driven and rotated by a drive source; an output shaft; at least a pair of disks supported so as to be relatively rotated with respect to each other and concentric with each other; a plurality of power rollers held between the pair of disks; a plurality of trunnions rotatably supporting the power rollers; and a hydraulic actuator including a pair of oil pressure chambers and causing each of the trunnions to generate a force proportional to a difference between oil pressures within the pair of oil pressure chambers, the toroidal-type continuously variable transmission unit changing a transmission ratio between the pair of disks by shifting the trunnions in the axial direction of pivot shafts as the swing centers of the respective trunnions by using the actuator; and, a differential unit of a gear type including a combination of a plurality of gears, wherein relative shifting speeds between the plurality of gears of the differential unit are changed by adjusting the transmission ratio of the toroidal-type continuously variable transmission unit, thereby the continuously variable transmission apparatus switches the rotation state of the output shaft over between a forward rotation state and a backward rotation state with a stop state between them while rotating the input shaft in one direction by the drive source, and the control apparatus having: rotation speed control unit for controlling the rotation speed of the drive source; transmission ratio setting unit for setting the transmission ratio of the toroidal-type continuously variable transmission unit in order to coincide the rotation speed of the input shaft of the continuously variable transmission apparatus with the controlled rotation speed of the drive source; oil pressure measuring unit for measuring a pressure difference between the oil pressures of the pair of oil pressure chambers of the actuator; and, transmission ratio correcting unit operating in response to a deviation of a pressure difference between a measured value by the oil pressure measuring unit and a target value of a torque passing through the toroidal-type continuously variable transmission unit, and adjusting the transmission ratio of the toroidal-type continuously variable transmission unit so as to eliminate the deviation.

According to the present control apparatus, when an actual measured value of a torque actually passing through the toroidal-type continuously variable transmission unit has a deviation with respect to the target value of the torque and in a direction in such a manner that an input-shaft-side disk of the pair of disks applies a torque to the power rollers, the transmission ratio correcting unit changes the transmission ratio of the toroidal-type continuously variable transmission unit to the speed reducing side, and when the actual measured value of the torque has a deviation with respect to the target value of the torque and in a direction in such a manner that the input-shaft-side disk receives a torque from the power rollers, the transmission ratio correcting unit changes the transmission ratio of the toroidal-type continuously variable transmission unit to the speed increasing side.

Also, the upper limit of the set value of the transmission ratio of the toroidal-type continuously variable transmission unit set by the transmission ratio setting unit is set to the amount corrected in accordance with a deviation between the measured value and the target value of the pressure difference.

Preferably, the control apparatus may further comprise: an electric control circuit for setting the transmission ratio of the toroidal-type continuously variable transmission unit and a target value of a pressure difference based on the target value of a torque passing through the toroidal-type continuously variable transmission unit; and, a hydraulic control circuit for calculating a deviation between the target value and the measured value of the pressure difference by comparing the target value with the measured value and correcting the transmission ratio of the toroidal-type continuously variable transmission unit based on the deviation.

Also, preferably, the control apparatus may further include: a stepping motor for setting the transmission ratio of the toroidal-type continuously variable transmission unit; a differential pressure cylinder for correcting the transmission ratio of the toroidal-type continuously variable transmission unit; a transmission ratio control valve for switching the supply of an oil pressure to the actuator for shifting the trunnions in the axial direction of the pivot shafts; and, a link arm for connecting together the output portion of the stepping motor, the output portion of the differential pressure cylinder, and the transmission ratio control valve.

In the present control apparatus, the transmission ratio control valve is interposed between the stepping motor and the differential pressure cylinder.

Also, the differential pressure cylinder is interposed between the stepping motor and the transmission ratio control valve.

Further, the stepping motor is disposed downward of the differential unit of the gear type.

In the present control apparatus, an elastic member is mounted on at least one of a connecting portion between the link arm and the output portion of the stepping motor, a connecting portion between the link arm and the output portion of the differential pressure cylinder, and a connecting portion between the link arm and the transmission ratio control valve.

And, the elastic member is a plate spring made of metal, the link arm includes a cut-away portion formed in the end portion thereof, a securing pin projected from the output portion of the stepping motor or the differential pressure cylinder or projected from the transmission ratio control valve is engaged into the cut-away portion of the link arm, and a metal spring secured to the output portion presses against the end portion of the link arm to thereby bring the inside edge of the cut-away portion into elastic contact with the outer peripheral surface of the securing pin.

Alternatively, the elastic member is a compression coil spring made of metal, a pair of slide members are fitted with the outer surface of the output portion of the stepping motor or the output portion of the differential pressure cylinder or the transmission ratio control valve so as to be shifted in the axial direction thereof, the pair of slide members respectively include through holes formed in the mutually matched portions thereof, a pivotally supporting pin is projectingly provided on the side surface of the middle portion of the link arm and is inserted through the through holes of the pair of slide members, and the compression coil spring presses against the pair of slide members in approaching directions each other to thereby hold the pivotally supporting pin elastically between the respective inner peripheral surfaces of the through holes formed in the two slide members.

And, in the present control apparatus, when the electric control circuit is at fault, the target value of the torque passing through the toroidal-type continuously variable transmission unit and transmitted to the output shaft is set the maximum value within a restricted range.

Now, according to a second aspect of the invention, there is provided a control method for controlling transmission ratio of a toroidal-type continuously variable transmission unit of a continuously variable transmission apparatus, the continuously variable transmission apparatus, having: a toroidal-type continuously variable transmission unit including: an input shaft driven and rotated by a drive source; an output shaft; at least a pair of disks supported so as to be relatively rotated with respect to each other and concentric with each other; a plurality of power rollers held between the pair of disks; a plurality of trunnions rotatably supporting the power rollers; and a hydraulic actuator including a pair of oil pressure chambers and causing each of the trunnions to generate a force proportional to a difference between oil pressures within the pair of oil pressure chambers, the toroidal-type continuously variable transmission unit changing a transmission ratio between the pair of disks by shifting the trunnions in the axial direction of pivot shafts as the swing centers of the respective trunnions by using the actuator; and, a differential unit of a gear type including a combination of a plurality of gears, wherein relative shifting speeds between the plurality of gears of the differential unit are changed by adjusting the transmission ratio of the toroidal-type continuously variable transmission unit, thereby the continuously variable transmission apparatus switches the rotation state of the output shaft over between a forward rotation state and a backward rotation state with a stop state between them while rotating the input shaft in one direction by the drive source, and the control method, for controlling a torque passing through the toroidal-type continuously variable transmission unit to a target value, having steps of: controlling the rotation speed of the drive source; setting the transmission ratio of the toroidal-type continuously variable transmission unit at a value necessary to coincide the rotation speed of the input shaft of the continuously variable transmission apparatus with the controlled rotation speed of the drive source; measuring a pressure difference between the oil pressures of the pair of oil pressure chambers of the actuator to thereby measure a torque actually passing through the toroidal-type continuously variable transmission unit, calculating a deviation of the torque actually passing through the toroidal-type continuously variable transmission unit with respect to the target value based on the measured and the target value of the torque, and adjusting the transmission ratio of the toroidal-type continuously variable transmission unit so as to eliminate the deviation.

In the present control method, in the range where the torque passing through the toroidal-type continuously variable transmission unit is restricted within the target value, the torque of the drive source for driving the input shaft is changed in a decreasing direction as the rotation speed of the input shaft increases, and when the measured value of the torque actually passing through the toroidal-type continuously variable transmission unit has a deviation with respect to the target value and in a direction where the input-shaft-side disk applies a torque to the power rollers, the toroidal-type continuously variable transmission unit is changed to the speed reducing side, and when the measured value has a deviation with respect to the target value and in a direction where the input-shaft-side disk receives a torque from the power rollers, the toroidal-type continuously variable transmission unit is changed to the speed increasing side.

And, the upper limit of the set value of the transmission ratio of the toroidal-type continuously variable transmission unit necessary to make the torque passing through the toroidal-type continuously variable transmission unit approach the target value is set to the amount corrected based on a deviation between the measured and target values of the pressure difference.

Further, according to the present control method, the setting the transmission ratio of the toroidal-type continuously variable transmission unit necessary to restrict the torque passing through the toroidal-type continuously variable transmission unit to the target value and the target value of the pressure difference based on the torque target value are electrically executed, and the calculating a deviation between the target value and the measured value of the pressure difference by comparing the target value with the measured value, and correcting the transmission ratio of the toroidal-type continuously variable transmission unit based on the deviation are hydraulically executed.

In the case of the above-mentioned control method and apparatus for controlling the transmission ratio of a toroidal-type continuously variable transmission unit for a continuously variable transmission apparatus, control for restricting the torque passing through the toroidal-type continuously variable transmission unit to the target value is executed in two stages. Thanks to this, while preventing the over-shoot phenomenon (and further a hunting phenomenon resultant from the over-shoot phenomenon) from occurring, or while, even when the over-shoot phenomenon (and further the hunting phenomenon) occurs, controlling it down to a practically negligible level, the above torque can be restricted to the target value.

BRIEF DESCRIPTION OF THE DRAWINGS

FIG. 6 is a partially cut-away bottom view of the continuously variable transmission apparatus with an oil pan omitted, showing a second embodiment of a mechanism for controlling the transmission ratio of the toroidal-type continuously variable transmission unit according to the present torque passing through the toroidal-type continuously variable transmission unit;

FIG. 9A is a section view of the plate spring when it is viewed from the same direction as FIG. 8, and FIG. 9B is a view thereof when it is viewed from above FIG. 9A;

DETAILED DESCRIPTION OF THE PREFERRED EMBODIMENTS

Figure 1:
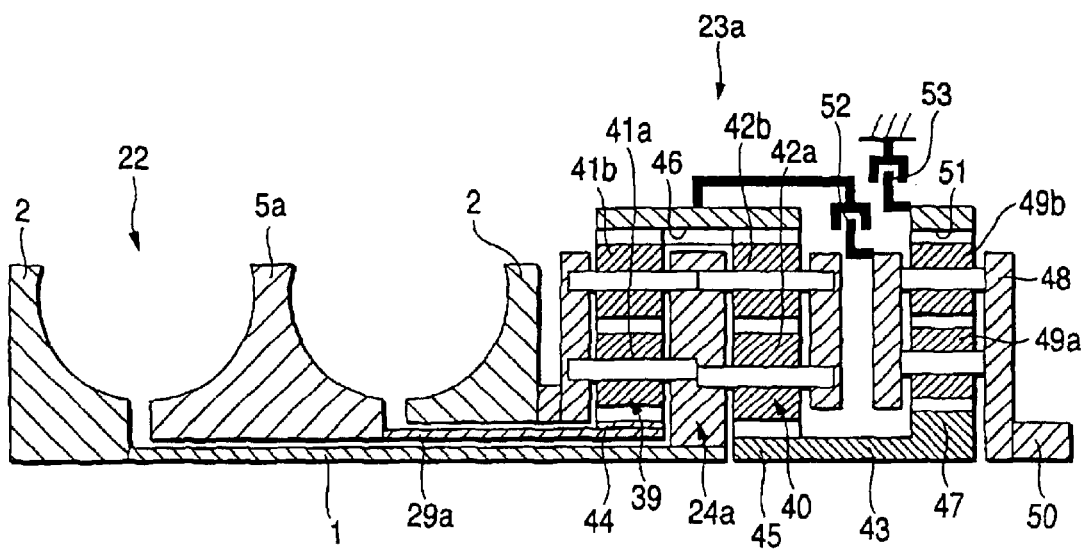
FIG. 1 is a schematic section view of a half section of an example of a continuously variable transmission apparatus to which the invention is applied.

Now, FIG. 1 shows a first example of the structure of a continuously variable transmission apparatus to which transmission ratio controlling method and apparatus according to the invention are applied. Prior to description of the transmission ratio controlling method and apparatus according to the invention, firstly, description will be given below of the structure and operation of the continuously variable transmission apparatus. Although the present continuously variable transmission apparatus has the same function as the conventionally known continuously variable transmission apparatus previously shown in FIG. 16, the structure of the planetary-gear-type transmission unit 23a portion thereof is improved to thereby enhance the assembling efficiency of the present planetary-gear-type transmission unit 23a portion.

On the two side surfaces of a carrier 24a, which can be rotated together with the input shaft 1 and a pair of input side disks 2, 2, there are supported first and second planetary gears 39, 40 each of which is of a double pinion type. That is, the first and second planetary gears 39, 40 are respectively composed of a pair of planetary gear elements 41a, 41b and a pair of planetary gear elements 42a, 42b. And, these planetary gear elements 41a, 41b and 42a, 42b are meshingly engaged with each other; and, the planetary gear elements 41a, 42a on the inside diameter side are meshingly engaged with first and second sun gears 44, 45 fixedly disposed on a hollow rotary shaft 29a connected to an output side disk 5a and a transmission shaft 43, while the planetary gear elements 41b, 42b on the outside diameter side are meshingly engaged with a ring gear 46. By the way, the hollow rotary shaft 29a and transmission shaft 43 are supported in such a manner that they are concentric with the input shaft 1 and can be rotated independently of each other.

On the other hand, on a second carrier 48 disposed on the periphery of a third sun gear 47 fixedly disposed on the other end portion (in FIG. 1, the right end portion) of the transmission shaft 43, there are rotatably supported planetary gear elements 49a, 49b. By the way, the second carrier 48 is fixedly disposed on the base end portion (in FIG. 1, the left end portion) of an output shaft 50 which is concentrically disposed with the input shaft 1. Also, the planetary gear elements 49a, 49b are meshingly engaged with each other; and, one planetary gear element 49a is meshingly engaged with the third sun gear 47, while the other planetary gear element 49b is meshingly engaged with a second ring gear 51 which is rotatably disposed on the periphery of the second carrier 48. Also, the ring gear 46 and second carrier 48 can be engaged with and removed from each other using a low-speed clutch 52, while the second ring gear 51 and a fixed portion such as a housing can be engaged with and removed from each other using a high-speed clutch 53.

In the case of the thus-structured continuously variable transmission, in a state where the low-speed clutch 52 is connected and the connection of the high-speed clutch 53 is cut off, the power of the input shaft 1 is transmitted through the ring gear 46 to the output shaft 50. And, by changing the transmission ratio of the toroidal-type continuously variable transmission unit 22, the transmission ratio $e_{CVT}$ of the whole of the continuously variable transmission apparatus, that is, a transmission ratio between the input shaft 1 and output shaft 50 can be changed. In this case, the relationship between the transmission ratio $e_{CVU}$ of the toroidal-type continuously variable transmission unit 22 and the transmission ratio $e_{CVT}$ of the whole of the continuously variable transmission apparatus can be expressed by the following equation (1) where a ratio between the teeth number $m_{46}$ of the ring gear 46 and the teeth number $m_{44}$ of the first sun gear 44 is expressed as $i_1 (= m_{46}/m_{44})$.

$$e_{CVT} = (e_{CVU} + i_1 - 1)/i_1 \qquad (1)$$

Figure 2:
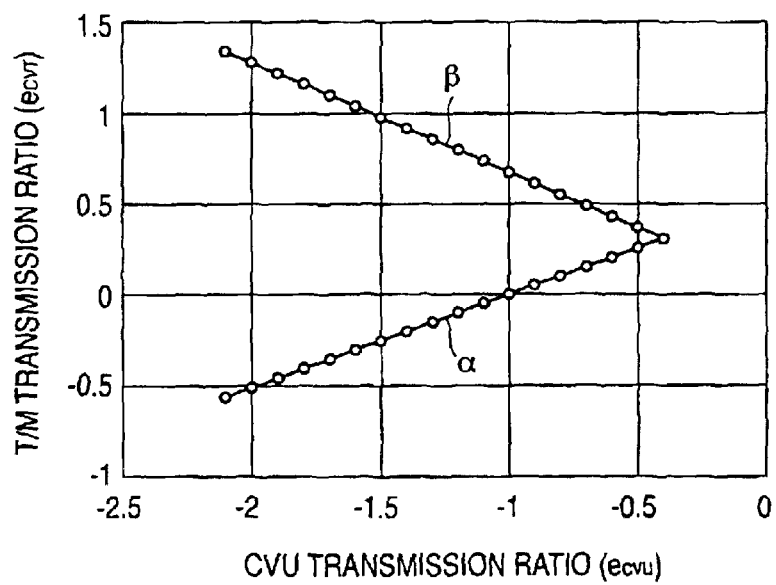
FIG. 2 is a graphical representation of the relationship between the transmission ratio of the whole of a continuously variable transmission apparatus (T/M) and the transmission ratio of a toroidal-type continuously variable transmission unit (CVU) incorporated into the continuously variable transmission apparatus.

And, for example, in case where the ratio $i_1$ between the teeth numbers is 2, the relationship between the two transmission ratios $e_{CVU}$ and $e_{CVT}$ varies in such a manner as shown by a line α in FIG. 2.

On the other hand, in a state where the connection of the low-speed clutch 52 is cut off and the high-speed clutch 53 is connected, the power of the input shaft 1 is transmitted through the first planetary gear 39, ring gear 46, second planetary gear 40, transmission shaft 43, planetary gear elements 49a, 49b and second carrier 48 to the output shaft 50. And, by changing the transmission ratio $e_{CVU}$ of the toroidal-type continuously variable transmission unit 22, the transmission ratio $e_{CVT}$ of the whole of the continuously variable transmission apparatus can be changed. In this case, the relationship between the transmission ratio $e_{CVU}$ of the toroidal-type continuously variable transmission unit 22 and the transmission ratio $e_{CVT}$ of the whole of the continuously variable transmission apparatus can be expressed by the following equation (2). By the way, in the equation (2), $i_1$ expresses a ratio between the teeth number $m_{46}$ of the ring gear 46 and the teeth number $m_{44}$ of the first sun gear 44 $(m_{46}/m_{44})$, $i_2$ expresses a ratio between the teeth number $m_{46}$ of the ring gear 46 and the teeth number $m_{45}$ of the second sun gear 45 $(m_{46}/m_{45})$, and $i_3$ expresses a ratio between the teeth number $m_{51}$ of the second ring gear 51 and the teeth number $m_{47}$ of the third sun gear 47 $(m_{51}/m_{47})$, respectively.

$$e_{CVT} = \{1/(1-i_3)\} \times \{1 + (i_2/i_1)(e_{CVU} - 1)\} \qquad (2)$$

And, in case where $i_1$ is 2, $i_2$ is 2.2 and $i_3$ is 2.8, the relationship between the two transmission ratios $e_{CVU}$ and $e_{CVT}$ varies in such a manner as shown by a line β in FIG. 2.

In the case of the above structured and operated continuously variable transmission apparatus, as can be seen clearly from the line α in FIG. 2, it is possible to create a so called infinitely large transmission ratio state in which the output shaft 50 can be stopped while the input shaft 1 remains rotating. However, in a state in which the output shaft 50 is stopped or is rotated at a very low speed while the input shaft 1 is left rotating, as described above, the torque passing through the toroidal-type continuously variable transmission unit 22 becomes larger than the torque that is applied from the engine serving as a drive source to the input shaft 1. For this reason, in the stopping time of the car or in the very-low-speed running time of the car, in order to prevent the torque passing through the toroidal-type continuously variable transmission unit 22 from becoming excessively large (or excessively small), the torque to be input from the drive source to the input shaft 1 must be restricted properly.

Also, in the very-low-speed running time of the car, in a state close to a state where the output shaft 50 is made to stop, that is, in a state where the transmission ratio of the continuously variable transmission apparatus is very large and the rotation speed of the output shaft 50 is greatly larger than the rotation speed of the input shaft 1, the torque to be applied to the output shaft 50 varies greatly due to slight variations in the transmission ratio of the continuously variable transmission apparatus. Therefore, in order to secure the smooth driving operation, similarly to the above, the torque to be input from the drive source to the input shaft 1 must be restricted properly.

Figure 16:
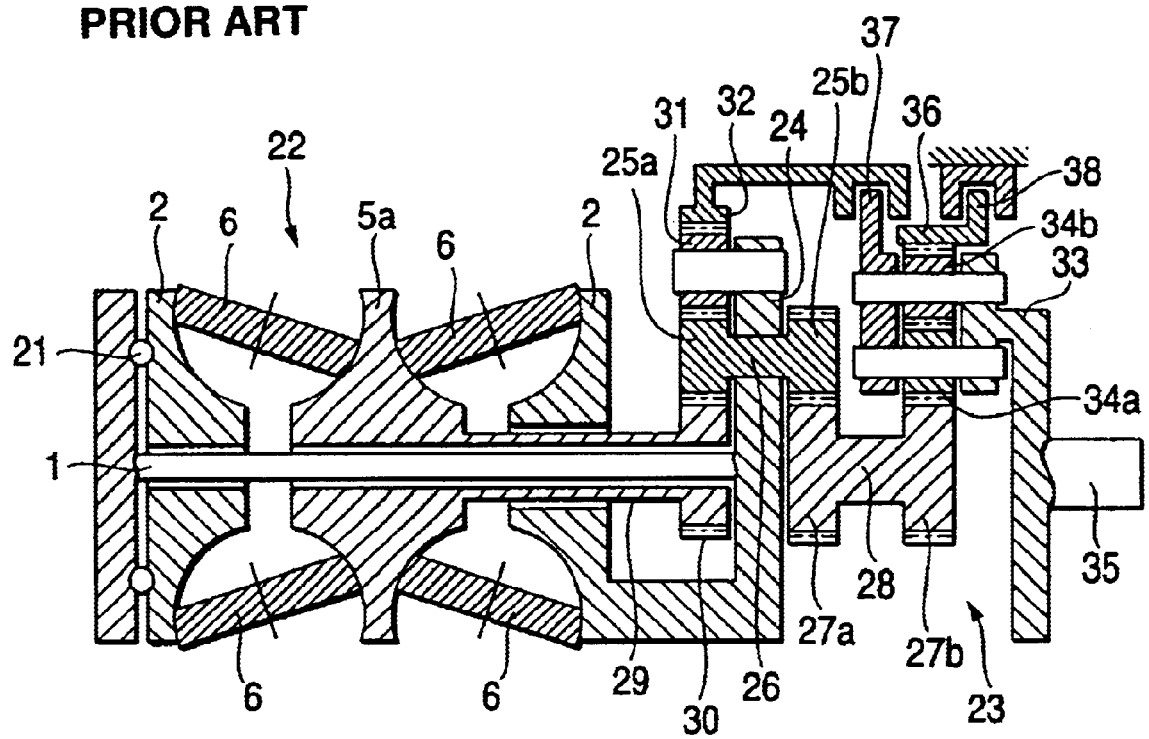
FIG. 16 is a section view of an example of a conventionally known continuously variable transmission apparatus.

By the way, in a speed increasing time or in a constant speed running time in the above-mentioned low-speed mode, the torque passing through the toroidal-type continuously variable transmission unit 22, similarly to the conventional structure previously shown in FIG. 16, is applied from the input shaft 1 through the carrier 24a, first planetary gear 39, first sun gear 44 and hollow rotary shaft 29a to the output side disk 5a; and, this torque is further applied from the output side disk 5a through the power rollers 6, 6 to the input side disks 2, 2. That is, the torque passing through the toroidal-type continuously variable transmission unit 22 in the speed increasing time or in the constant speed running time circulates in a direction where the input side disks 2, 2 respectively receive the torque from the power rollers 6, 6.

Figure 3:
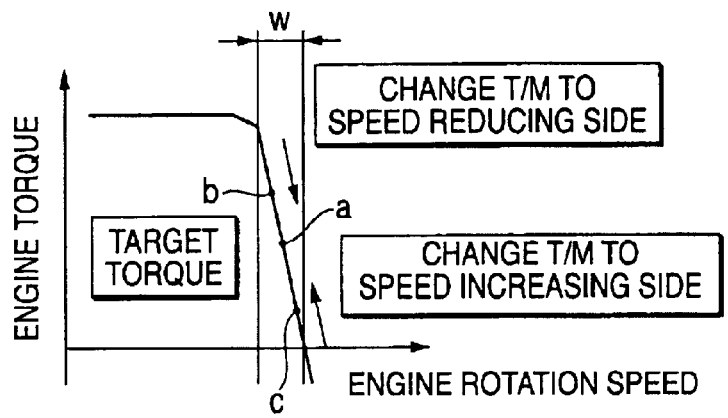
FIG. 3 is an explanatory view of a state for changing the transmission ratio of the whole of the continuously variable transmission apparatus according to the rotation speed and torque of an engine.

In the present example, as described above, the operation to restrict properly the torque input from the drive source to the input shaft 1 is executed in such a manner as shown in FIG. 3. Firstly, the rotation speed of the engine serving as the drive source is controlled roughly. That is, the rotation speed of the engine is restricted to the point a in the w range shown in FIG. 3. At the same time, there is set the transmission ratio of the toroidal-type continuously variable transmission unit 22 that is necessary to coincide the rotation speed of the input shaft 1 of the continuously variable transmission with the rotation speed of the engine. This setting operation is carried out according to the above-mentioned equation (1). That is, a mode, in which the torque to be transmitted from the engine to the input shaft 1 must be restricted strictly according to the control method of the invention, is a so called low-speed mode in which the low-speed clutch 52 is connected and the connection of the high-speed clutch 53 is cut off. Therefore, the transmission ratio of the toroidal-type continuously variable transmission unit 22 is set according to the above-mentioned equation (1) in such a manner that the rotation speed of the input shaft 1 can be made to correspond to the required rotation speed of the output shaft 50.

Also, a pressure difference between a pair of oil-pressure chambers 54a, 54b (see FIGS. 5 and 15), which constitute the oil-pressure-type actuators 10, 10 used to shift the trunnions 7, 7 incorporated into the toroidal-type continuously variable transmission unit 22 in the axial directions of the pivot shafts 9, 9, is measured using an oil pressure sensor (not shown). This oil pressure measuring operation is carried out in a state in which the rotation speed of the engine is controlled roughly (however, the rotation speed is maintained constant) and the transmission ratio of the toroidal-type continuously variable transmission unit 22 is, as described above, set according to the above-mentioned equation (1). And, according to the pressure difference obtained through the measuring operation, there is calculated the torque $T_{CVU}$ that passes through the toroidal-type continuously variable transmission unit 22.

That is, since the pressure difference is proportional to the torque $T_{CVU}$ that passes through the toroidal-type continuously variable transmission unit 22 as long as the transmission ratio of the toroidal-type continuously variable transmission unit 22 is constant, the torque $T_{CVU}$ can be obtained according to the pressure difference. The reason for this is as follows: that is, as described above, the actuators 10, 10 support the force 2 Ft having the magnitude proportional to the torque to be transmitted from the input side disks 2, 2 to the output side disk 5a (or from the output side disk 5a to the input side disks 2, 2) (=the torque $T_{CVU}$ that passes through the toroidal-type continuously variable transmission unit 22).

On the other hand, the torque $T_{CVU}$ can be obtained according to the following equation (3) as well.

$$T_{CVU} = e_{CVU} \times T_{IN}/\{e_{CVU} + (i_1 - 1)\eta_{CVU}\} \quad (3)$$

In the equation (3), $e_{CVU}$ expresses the transmission ratio of the toroidal-type continuously variable transmission unit 22, $T_{IN}$ expresses the torque to be input from the engine to the input shaft 1, $i_1$ expresses the teeth number ratio of the first planetary gear 39 (the ratio between the teeth number $m_{46}$ of the ring gear 46 and the teeth number $m_{44}$ of the first sun gear 44), and $\eta_{CVU}$ expresses the efficiency of the toroidal-type continuously variable transmission unit 22, respectively.

Thus, according to the torque $T_{CVU1}$ passing through the toroidal-type continuously variable transmission unit 22 obtained from the pressure difference and the target torque $T_{CVU2}$ obtained from the above equation (3), there is found a deviation $\Delta T$ between the actually passing torque $T_{CVU1}$ and target torque $T_{CVU2}$ ($=T_{CVU1}-T_{CVU2}$). And, the transmission ratio of the toroidal-type continuously variable transmission unit 22 is adjusted in a direction where the deviation $\Delta T$ can be eliminated ($\Delta T=0$). By the way, since the deviation $\Delta T$ of the torque and the deviation of the pressure difference are proportional to each other, the above transmission ratio adjusting operation can be executed according to the torque deviation as well as according to the deviation of the pressure difference. That is, the transmission ratio control according to the torque deviation is quite the same as the transmission ratio control according to the deviation of the pressure difference from the technical viewpoint.

For example, let us assume a case in which, as shown in FIG. 3, in the range of restricting the torque $T_{CVU1}$ (measured value) passing through the toroidal-type continuously variable transmission unit 22 to the target torque $T_{CVU2}$, the torque $T_{IN}$ with which the engine drives the input shaft 1 varies suddenly in the reducing direction as the rotation speed of the input shaft 1 increases. Such engine characteristic can be obtained easily even in the low-speed rotation area, provided the engine is controlled electronically. In the case of the engine having such engine characteristic, when the input side disks 2, 2 have a deviation in a direction where they receive torques from the power rollers 6, 6 (see FIGS. 14 and 15) by comparing the measured value $T_{CVU1}$ of the torque with the target value $T_{CVU2}$ of the torque, in order to increase the rotation speed of the engine to thereby reduce the torque $T_{IN}$ for driving the input shaft 1, the transmission ratio of the whole of the continuously variable transmission apparatus is shifted to the speed reducing side. Accordingly, the transmission ratio of the toroidal-type continuously variable transmission unit 22 is changed over to the speed increasing side.

Figure 14:
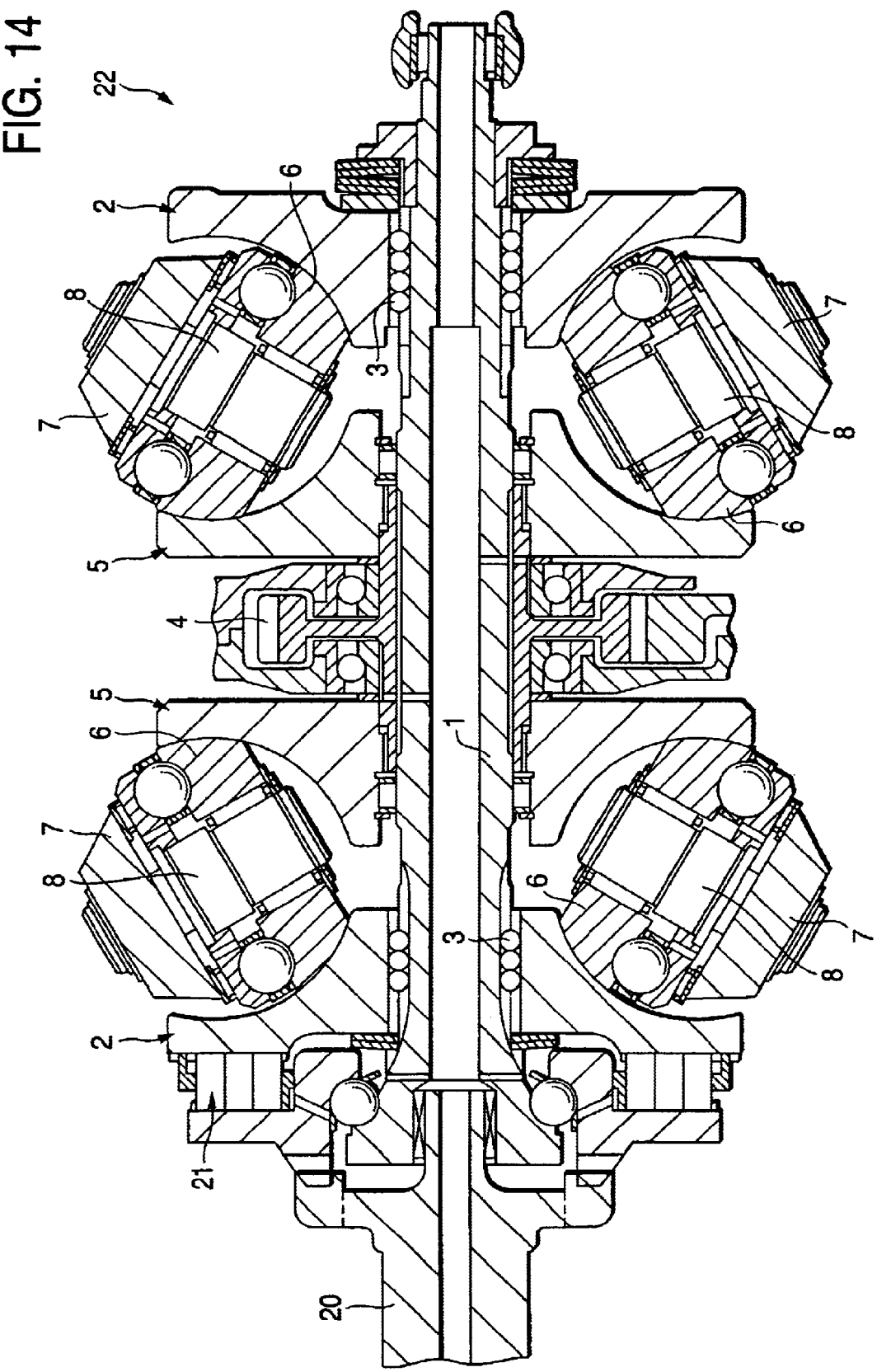
FIG. 14 is a section view taken along the line C—C shown in FIG. 13.
Figure 15:
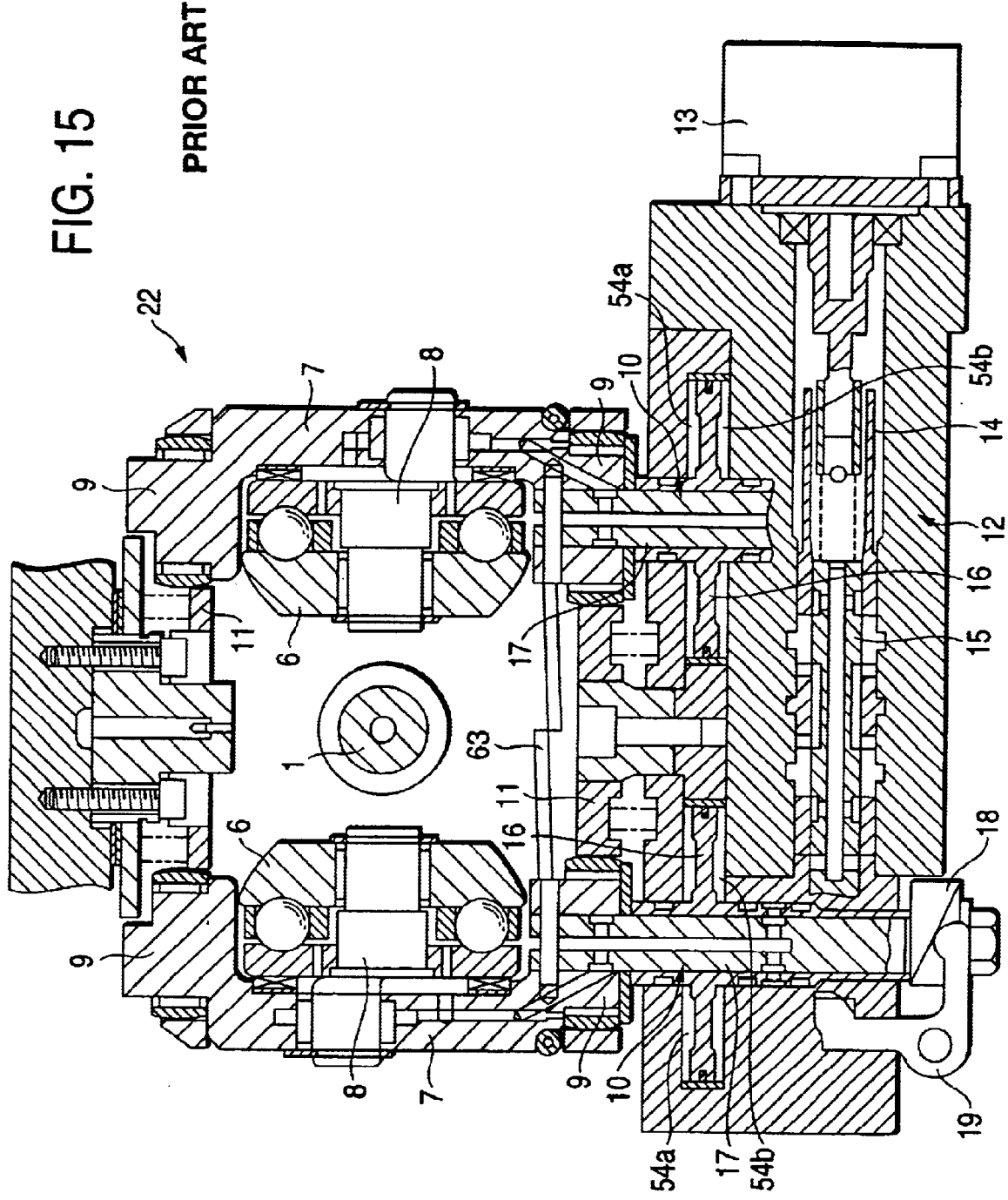
FIG. 15 is a section view taken along the line D—D shown in FIG. 13.

However, in a state where the brakes are stepped down and the car is stopping (the rotation speed of the output shaft=0), the transmission ratio of the toroidal-type continuously variable transmission unit 22 is controlled within the range where such control amount can be absorbed by slippage caused in the interior of the toroidal-type continuously variable transmission unit 22, that is, slippage caused in the contact portions (traction part) between the inner surfaces of the input side and output side disks 2, 5*a* and the peripheral surfaces of the power rollers 6, 6 (see FIGS. 14 and 15). Therefore, the allowable range capable of controlling the transmission ratio is limited to the range where an unreasonable force is not applied to the contact portions, and thus the allowable range is limited when compared with the low-speed running time.

For example, in FIG. 3, in case where the above target value $T_{CVU2}$ exists at the point a, when the measured value $T_{CVU1}$ exists at the point b in FIG. 3, there is provided a state where the input side disks 2, 2 have a deviation of a direction in which they receive the torques from the power rollers 6, 6. Thus, the transmission ratio $e_{CVU}$ of the toroidal-type continuously variable transmission unit 22 is changed over to the speed increasing side to thereby change the transmission ratio $e_{CVT}$ of the whole of the continuously variable transmission apparatus to the speed reducing side. In combination with this, the rotation speed of the engine is increased to thereby reduce the torque. On the other hand, when the measured value $T_{CVU1}$ exists at the point c in FIG. 3, there is provided a state where the input side disks 2, 2 have a deviation of a direction in which they apply their torques to the power rollers 6, 6. In this case, reversely to the previously discussed case, the transmission ratio $e_{CVU}$ of the toroidal-type continuously variable transmission unit 22 is changed over to the speed reducing side to thereby change the transmission ratio $e_{CVT}$ of the whole of the continuously variable transmission apparatus to the speed increasing side. In combination with this, the rotation speed of the engine is reduced to thereby increase the torque.

Next, the above-mentioned operations are executed repeatedly until the torque $T_{CVU1}$ passing through the toroidal-type continuously variable transmission unit 22 obtained from the pressure difference coincides with the target torque $T_{CVU2}$. That is, in case where the torque $T_{CVU1}$ passing through the toroidal-type continuously variable transmission unit 22 obtained from the pressure difference cannot be made to coincide with the target torque $T_{CVU2}$ only by one-time transmission control of the toroidal-type continuously variable transmission unit 22, the above-mentioned operations are executed repeatedly. As a result of this, the torque $T_{IN}$ with which the engine drives and rotates the input shaft 1 can be increased or reduced, and the torque $T_{CVU1}$ passing through the toroidal-type continuously variable transmission unit 22 can be made to approach the target torque $T_{CVU2}$. By the way, the above operations are carried out automatically and in a short period of time according to an instruction to be issued from a microcomputer which is incorporated into a control unit of the continuously variable transmission apparatus.

Figure 4:
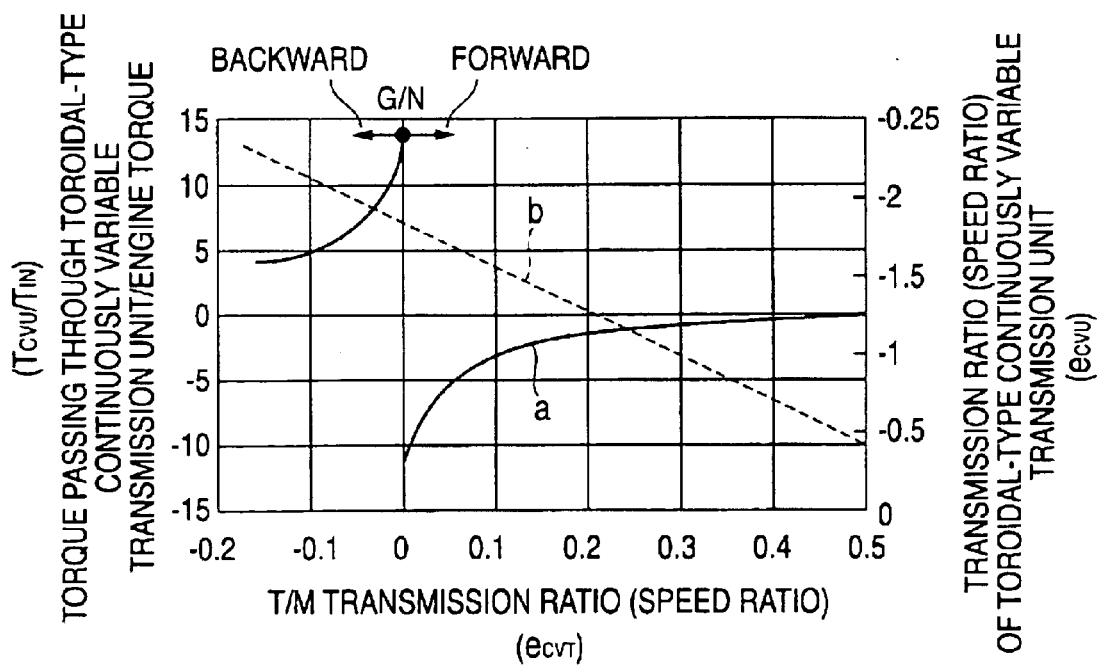
FIG. 4 is a graphical representation of the relationship of the torque passing through the toroidal-type continuously variable transmission unit and the transmission ratio of the toroidal-type continuously variable transmission unit with respect to the transmission ratio of the whole of the continuously variable transmission apparatus.

Now, FIG. 4 shows a ratio (left-side vertical axis) between the torque $T_{CVU}$ passing through the toroidal-type continuously variable transmission unit 22 and the torque $T_{IN}$ with which the engine drives and rotates the input shaft 1, and the relationship between the transmission ratio $e_{CVT}$ (horizontal axis) of the whole of the continuously variable transmission apparatus and the transmission ratio $e_{CVU}$ (right-side vertical axis) of the toroidal-type continuously variable transmission unit 22. In FIG. 4, a solid line a shows the relationship of the ratio between the passing torque $T_{CVU}$ and the drive torque (engine torque) $T_{IN}$ with respect to the transmission ratio $e_{CVT}$ of the whole of the continuously variable transmission apparatus; and a broken line b shows the relationship between the above-mentioned two transmission ratios $e_{CVT}$ and $e_{CVU}$. In the present embodiment, in a state where the transmission ratio $e_{CVT}$ of the whole of the continuously variable transmission apparatus is restricted to a given value, the transmission ratio $e_{CVU}$ of the toroidal-type continuously variable transmission unit 22 is restricted in such a manner that the torque $T_{CVU1}$ actually passing through the toroidal-type continuously variable transmission unit 22 can be restricted to the target value ($T_{CVU2}$) shown by a point on the solid line a.

In the present embodiment, the control for restricting the torque $T_{CVU1}$ actually passing through the toroidal-type continuously variable transmission unit 22 to the point on the solid line a, namely, the target value $T_{CVU2}$ is carried out in two stages. That is, the rotation speed of the engine is controlled roughly, namely, the rotation speed of the engine is controlled to the rotation speed that is believed to be able to provide the target value $T_{CVU2}$; and, after then, the transmission ratio of the toroidal-type continuously variable transmission unit 22 is controlled according to the present rotation speed. Thanks to this, according to the present embodiment, while preventing occurrence of the over-shoot phenomenon (and thus the hunting phenomenon resulting from the over-shoot phenomenon) as in the conventional method or controlling such over-shoot phenomenon down to a negligible level even when it occurs, the torque $T_{CVU1}$ actually passing through the toroidal-type continuously variable transmission unit 22 can be restricted to the target value $T_{CVU2}$.

Next, with reference to FIG. 5, description will be given below of an embodiment of a circuit used in a portion for controlling the transmission ratio of the toroidal-type continuously variable transmission unit 22 in such a manner that the torque $T_{CVU1}$ actually passing through the toroidal-type continuously variable transmission unit 22 can be made to coincide with the target value $T_{CVU2}$. Pressure oil can be supplied through a transmission ratio control valve 12 to a pair of oil pressure chambers 54*a*, 54*b* constituting an oil-pressure-type actuator 10 used to shift the trunnion 7 in the axial direction (in FIG. 5, in the vertical direction) of the pivot shafts 9, 9. A sleeve 14, which constitutes the transmission ratio control valve 12, can be driven and shifted in the axial direction thereof by a stepping motor 13 through a rod 55 and a link arm 56. Also, a spool 15 constituting the transmission ratio control valve 12 can be engaged with the trunnion 7 through a link arm 19, a precess cam 18 and a rod 17, and, with the axial-direction shifting motion and swingingly shifting motion of the trunnion 7, the spool 15 can also be driven and shifted in the axial direction thereof. The above-mentioned structure is basically the same as the transmission ratio control mechanism of the toroidal-type continuously variable transmission unit that has been conventionally known.

Especially, in the present embodiment, in addition to the fact that the sleeve 14 is driven by the stepping motor 13, the sleeve 14 can also be driven by an oil-pressure-type differential pressure cylinder 57. That is, not only the leading end portion of the rod 55, the base end portion of which is connected to the sleeve 14, is pivotally supported on the middle portion of the link arm 56 but also, into two elongated holes respectively formed in the two end portions of the link arm 56, there are engaged two pins which can be pushed and pulled by the stepping motor 13 or by the differential pressure cylinder 57. When one pin is pushed and pulled, the other pin acts as the fulcrum of one pin. Thanks to this structure, the sleeve 14 can be shifted in the axial direction thereof not only by the stepping motor 13 but also by the differential pressure cylinder 57. In the present embodiment, due to the shifting motion of the sleeve 14 by the differential pressure cylinder 57, the transmission ratio $e_{CVU}$ of the toroidal-type continuously variable transmission unit 22 can be controlled according to the torque $T_{CVU}$ actually passing through the toroidal-type continuously variable transmission unit 22.

Therefore, according to the present embodiment, mutually different oil pressures can be introduced through a correcting control valve 59 into a pair of oil pressure chambers 58a, 58b which are respectively formed in the differential pressure cylinder 57. The oil pressures to be introduced into the respective oil pressure chambers 58a, 58b are determined in accordance with a pressure difference $\Delta P$ between oil pressures $P_{DOWN}$ and $P_{UP}$ acting on the interiors of the pair of oil pressure chambers 54a, 54b constituting the actuator 10 and a pressure difference $\Delta P_0$ between the output pressures of a pair of electromagnetic valves 60a, 60b respectively used to adjust the opening angle of the correcting control valve 59. That is, the opening and closing operations of these two electromagnetic valves 60a, 60b are controlled in accordance with an output signal which is operated by a control unit (a controller) (not shown) in such a manner that the pressure difference $\Delta P_0$ between the output pressures of these two electromagnetic valves 60a, 60b; can provide a target pressure difference corresponding to the target torque $T_{CVU2}$ of the toroidal-type continuously variable transmission unit 22 and also which is output from the control unit. Therefore, on a spool 61 which constitutes the correcting control valve 59, there are applied not only a force corresponding to the pressure difference $\Delta P$ between oil pressures acting on the interiors of the pair of oil pressure chambers 54a, 54b of the actuator 10 but also a force competing with the above force, namely, a force corresponding to the pressure difference $\Delta P_0$ between the output pressures of the two electromagnetic valves 60a, 60b which is a target pressure difference corresponding to the target torque $T_{CVU2}$.

And, in case where the torque $T_{CVU1}$ actually passing through the toroidal-type continuously variable transmission unit 22 coincides with the target value $T_{CVU2}$, that is, in case where the difference $\Delta T$ between the actually passing torque $T_{CVU1}$ and target value $T_{CVU2}$ is 0, the force corresponding to the pressure difference $\Delta P$ between oil pressures acting on the interiors of the pair of oil pressure chambers 54a, 54b of the actuator 10 balances with the pressure difference $\Delta P_0$ between the output pressures of the two electromagnetic valves 60a, 60b. Thanks to this, the spool 61 constituting the correcting control valve 59 is held at its neutral position, while the pressures respectively acting on the oil pressure chambers 58a, 58b of the differential pressure cylinder 57 are equal to each other. In this state, the spool 62 of the differential pressure cylinder 57 is held at its neutral position and thus the transmission ratio of the toroidal-type continuously variable transmission unit 22 remains unchanged (not corrected).

On the other hand, in case where there is a difference between the torque $T_{CVU1}$ actually passing through the toroidal-type continuously variable transmission unit 22 and the target value $T_{CVU2}$, the force corresponding to the pressure difference $\Delta P$ between oil pressures acting on the interiors of the pair of oil pressure chambers 54a, 54b of the actuator 10 does not balance with the pressure difference $\Delta P_0$ between the output pressures of the two electromagnetic valves 60a, 60b. And, the spool 61 constituting the correcting control valve 59 is shifted in the axial direction thereof according to the magnitude and direction of the difference $\Delta T$ between the actually passing torque $T_{CVU1}$ and target value $T_{CVU2}$, so that a proper oil pressure corresponding to the magnitude and direction of the difference $\Delta T$ is introduced into the oil pressure chambers 58a, 58b of the differential pressure cylinder 57. And, the spool 62 constituting the differential pressure cylinder 57 is shifted in the axial direction and, with the shifting motion of the spool 62, the sleeve 14 constituting the transmission ratio control valve 12 is shifted in the axial direction thereof. As a result of this, the trunnion 7 is shifted in the axial direction of the pivot shafts 9, 9, so that the transmission ratio of the toroidal-type continuously variable transmission unit 22 is changed (corrected).

By the way, the shifting direction of the transmission ratio and shifting amount thereof are as have previously been described with reference to FIGS. 3 and 4. Also, the shifting amount of the transmission ratio of the toroidal-type continuously variable transmission unit 22, that is, the amount to be corrected (the correction amount of the transmission ratio) is sufficiently small with respect to the transmission ratio width of the toroidal-type continuously variable transmission unit 22. Therefore, the stroke of the spool 62 of the differential pressure cylinder 57 is set sufficiently smaller than the stroke of the output portion of the stepping motor 13.

Next, FIG. 6 shows a second embodiment of the structure of the portion for shifting the sleeve 14 of the transmission ratio control valve 12 in the axial direction using the stepping motor 13 and differential pressure cylinder 57. In the case of the structure previously shown in FIG. 5, there is interposed the transmission ratio control valve 12 between the stepping motor 13 and differential pressure cylinder 57. On the other hand, in the present embodiment, between the stepping motor 13 and transmission ratio control valve 12, there is interposed the differential pressure cylinder 57. And, thanks to this structure, even in case where a small-size differential pressure cylinder is used as the differential pressure cylinder 57, it is possible to secure the stroke of the sleeve 14 that is necessary to control the torque. Description will be given below of this point with reference to FIG. 7.

Figure 5:
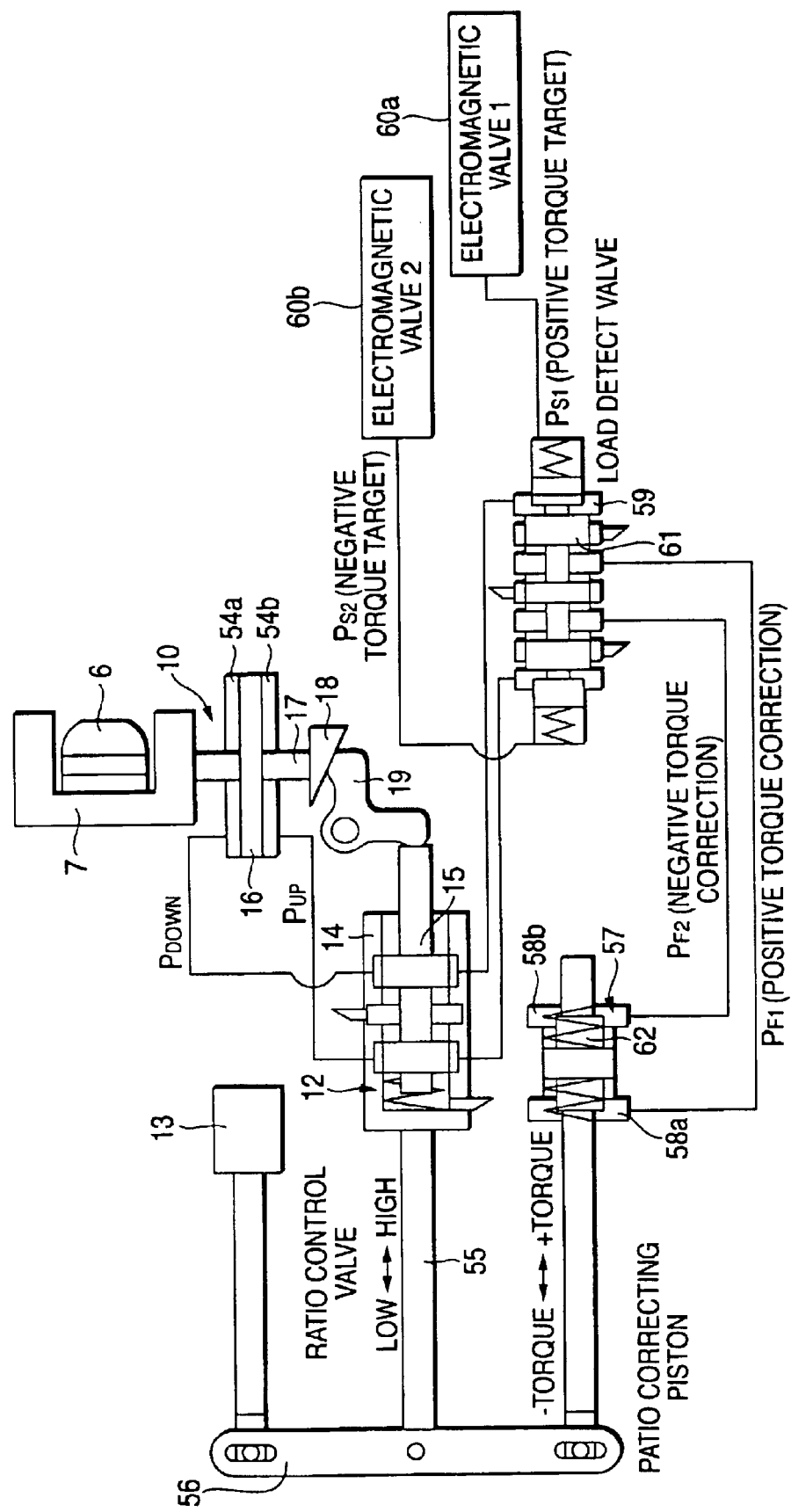
FIG. 5 is a block diagram of a first embodiment of a mechanism for controlling the transmission ratio of the toroidal-type continuously variable transmission unit according to the torque passing through the toroidal-type continuously variable transmission unit.
Figure 7A:
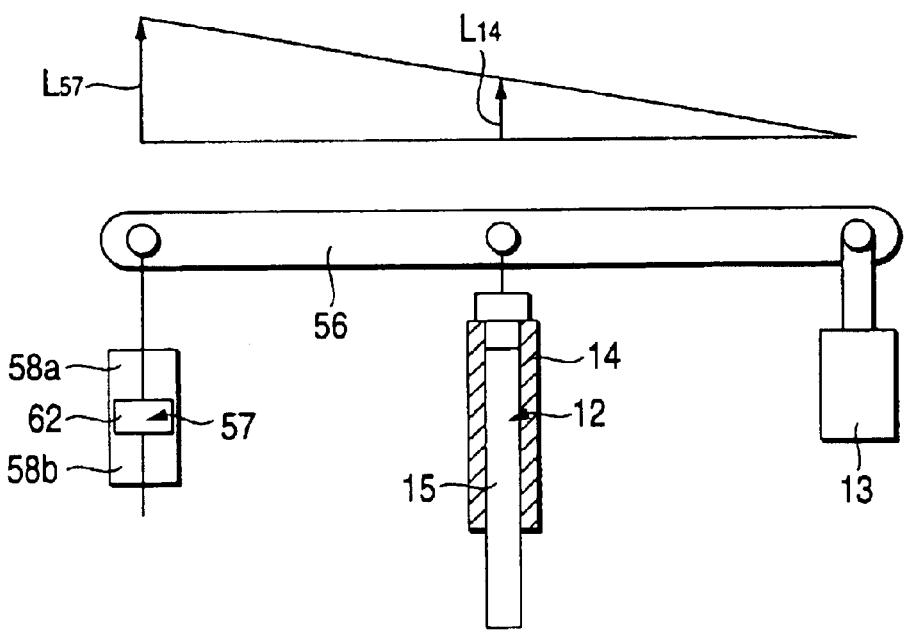
FIGS. 7A and 7B are typical views for explanation of the advantages of the structure of the second embodiment of the transmission ratio control mechanism.

As previously shown in FIG. 5, in case where the transmission ratio control valve 12 is interposed between the stepping motor 13 and differential pressure cylinder 57, when shifting the sleeve 14 in the axial direction using the differential pressure cylinder 57 for controlling of the torque, the link arm 56, as shown in FIG. 7A, is swung with the connecting portion thereof with the stepping motor 13 as a fulcrum. In this case, the stroke $L_{14}$ of the sleeve 14 is smaller than the stroke $L_{57}$ of the differential pressure cylinder 57 ($L_{57} > L_{14}$). Therefore, in order to secure the stroke $L_{14}$ of the sleeve 14 to thereby widen the torque controllable range, the stroke $L_{57}$ of the differential pressure cylinder 57 must be increased. However, since the differential pressure cylinder 57 must be installed in a limited space within a casing in which the continuously variable transmission apparatus is stored, it is not preferable to increase the stroke $L_{57}$ of the differential pressure cylinder 57.

Figure 7B:
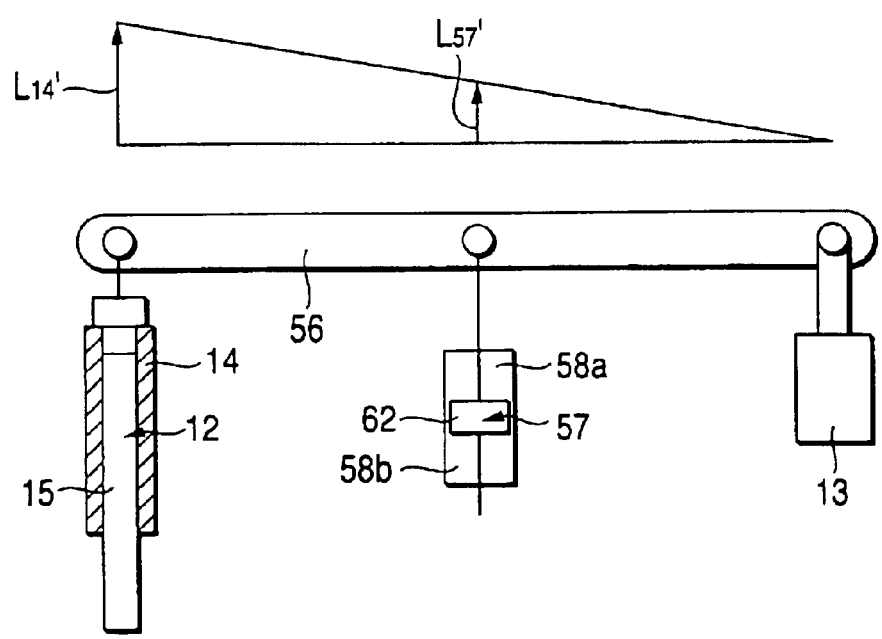

On the other hand, as shown in FIG. 6, in case where there is interposed the differential pressure cylinder 57 between the stepping motor 13 and transmission ratio control valve 12, when swinging the link arm 56 with the connecting portion thereof with the stepping motor 13 as a fulcrum using the differential pressure cylinder 57 for controlling of the torque, as shown in FIG. 7B, the stroke $L_{14}'$ of the sleeve 14 is larger than the stroke $L_{57}'$ of the differential pressure cylinder 57 ($L_{57}'<L_{14}'$). In the case of the structure shown in FIG. 6, the connecting portion between the differential pressure cylinder 57 and link arm 56 is set a position distant ⅓ from the transmission ratio control valve 12 side (distant ⅔ from the stepping motor 13 side) between the connecting portions of the two end portions of the link arm 56 with the stepping motor 13 and transmission ratio control valve 12. Therefore, the stroke $L_{14}'$ of the sleeve 14 is 1.5 times the stroke $L_{57}'$ of the differential pressure cylinder 57 ($L_{14}'=1.5 L_{57}'$). Thanks to this, even in case where a small-size differential pressure cylinder is used as the differential pressure cylinder 57, the torque controllable range can be widened. Since a force necessary to shift the sleeve 14 in the axial direction thereof can be reduced, it does not raise any special problem to reduce the above force while being able to increase the stroke $L_{14}'$ of the sleeve 14.

By the way, in the case of the structure shown in FIG. 6, the stepping motor 13 is disposed not just below the toroidal-type continuously variable transmission unit 22 but below the planetary-gear-type transmission unit 23a (see FIG. 1) which is disposed in the rear of the toroidal-type continuously variable transmission unit 22. Thanks to this structure, there is widened a space existing downwardly of the toroidal-type continuously variable transmission unit 22, thereby being able to enhance the freedom of arrangement of pipes for pressure oil in the present downward space. And, the arrangement distance of the pressure oil pipe for the transmission control is set short and as linearly as possible, thereby being able to reduce the resistance of the pressure oil pipe. Such reduction in the resistance of the pressure oil pipe can contribute toward enhancement in the response of the transmission operation.

Further, since it is necessary to install the precess cam 18 and link arm 19 which constitute a mechanical feedback mechanism, the transmission ratio control valve 12 must be disposed in the vicinity of the actuator 10 (see FIGS. 5 and 15) on which the precess cam 18 is disposed. In the case of the present embodiment, as described above, because the downward space of the toroidal-type continuously variable transmission unit 22 is formed wide, there is an advantage from the viewpoint of securing the installation position of the transmission ratio control valve 12. Thanks to the above advantages of the present embodiment, the oil-pressure pipes can be disposed in a high density just below the toroidal-type continuously variable transmission unit 22, which not only can reduce the size of the whole of the continuously variable transmission apparatus but also can reduce the volume of operating oil existing within the oil-pressure pipes. The reduction in the volume of the operating oil leads to a reduction of the delayed change in the oil pressure in the sudden transmission operation, which can contribute toward enhancing the response of the transmission operation including the transmission operation for control of the torque.

Next, FIGS. 8 to 11 respectively show a structure for preventing the shaky movements of engaging portions respectively between the link arm 56 and the leading end portio of the output rod 64 of the stepping motor 13, between the link arm 56 and the leading end portion of the spool 62 constituting the differential pressure cylinder 57, and between the link arm 56 and the end portion of the sleeve 14 (see FIG. 6) constituting the transmission ratio control valve 12. The reason for preventing the shaky movements of the respective engaging portions is to be able to transmit the axial-direction shifting movements of the output rod 64 and spool 62 to the sleeve 14 accurately to thereby control the transmission ratio strictly. In the case of a currently practically used transmission apparatus for a car which is composed simply of a toroidal-type continuously variable transmission unit, even when the transmission ratio of the toroidal-type continuously variable transmission unit is shifted a little from a desired value (for example, it is shifted from a desired value of 1.000 to 1.001), there hardly arises any problem. On the other hand, in the case of a continuously variable transmission apparatus to which the invention is applied, by adjusting the transmission ratio of the toroidal-type continuously variable transmission unit 22, the output shaft 50 (see FIG. 1) is caused to stop while the input shaft 1 is left rotating. Also, preferably, in this state, such a torque as to be able to run a car at a low speed may be transmitted to the output shaft 50 according to the selection position of a shift lever {the advancing direction (D range) or the retreating direction (R range) }. In order to be able to realize such condition, the transmission ratio of the toroidal-type continuously variable transmission unit 22 must be controlled very strictly.

On the other hand, when, of the respective engaging portions, at least one engaging portion shakes, even in case where the shifting amounts of the output rod 64 of the stepping motor 13 and the spool 62 of the differential pressure cylinder 57 are restricted strictly, there is a possibility that the axial-direction position of the sleeve 14 constituting the transmission ratio control valve 12 can be shifted from its predetermined position. And, due to this position shift of the sleeve 14, the direction and magnitude of the torque to be applied to the output shaft 50 of the continuously variable transmission apparatus cannot be set in a desired manner. Specifically, the torque allowing the car to run at a low speed cannot be transmitted to the output shaft 50 according to the selection position of the shift lever.

As disclosed in JP-2001-65676, in case where the link arm constituting the transmission ratio control mechanism is energized in a given direction using a spring, it is truly possible to eliminate the shaky movements of the above-mentioned respective engaging portions, but there arises such a new problem as follows. That is, as disclosed in JP-2001-65676, in case where the structure for energizing the link arm using a spring is applied to the structure according to the invention shown in FIG. 6, there is necessary an additional force to shift the link arm 56 by the stepping motor 13 and differential pressure cylinder 57, thereby being unable to make a fine adjustment of the axial-direction position of the sleeve 14, which makes it impossible to control the transmission ratio strictly.

Figure 8:
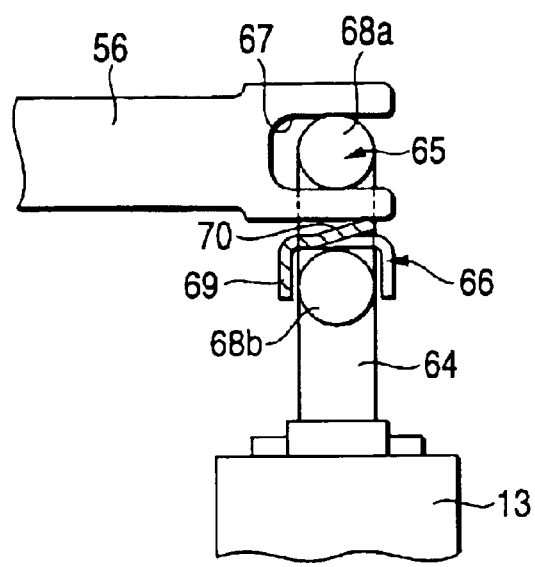
FIG. 8 is a view corresponding to the A portion shown in FIG. 6, showing a structure for preventing the shaky motion of an engaging portion between a link arm for shifting a sleeve constituting a control valve and an output rod of a stepping motor.

In view of the above circumstances, in the case of the present embodiment, on the engaging portion 65 between the link arm 56 and the output rod 64 that is the output portion of the stepping motor 13, as shown in FIG. 8, there is mounted a plate spring 66 which is an elastic member, thereby being able to eliminate the shaky movement of the engaging portion 65. For this purpose, according to the present embodiment, in one end portion of the link arm 56, there is formed a U-shaped cut-away portion 67; and, one end portion of the cut-away portion 67 is formed in a forked manner. Also, on one side surface of the leading end portion of the output rod 64, there are disposed a pair of securing pins 68a, 68b with a clearance in the axial direction (in FIG. 8, in the vertical direction) of the output rod 64 in such a manner that they are parallel to each other (in a state where they project toward this side in FIG. 8). And, of the two pins, the securing pin 68a on the leading end side (in FIG. 8, on the upper side) is engaged with (fitted with the inner surface of) the cut-away portion 67. Further, between the securing pin 68b situated near to the middle portion of the output rod (in FIG. 8, on the lower side) and one side edge (in FIG. 8, the lower edge) of one end portion of the link arm 56, there is mounted the plate spring 66.

Figure 9A:
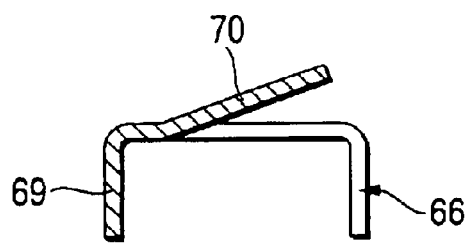
FIGS. 9A and 9B show plate springs for preventing the shaky motion of the engaging portion; specifically.
Figure 9B:
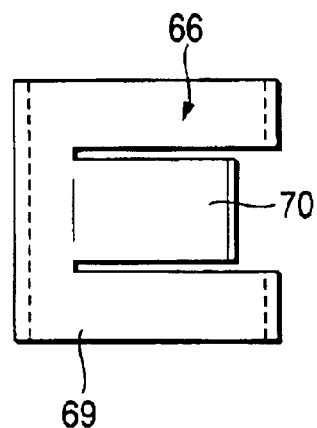

This plate spring 66 can be formed by bending an elastic metal plate such as a steel plate; and, as shown in FIG. 9, it includes a U-shaped base portion 69 and a pressure piece 70 which is formed by bending and raising the central portion of the base portion 69. In the case of the thus-structured plate spring 66, in a state where the base portion 69 thereof is fitted with the outer surface of the near-to-middle-portion securing pin 68b and the leading end edge of the pressure piece 70 is contacted with one side edge of one end portion of the link arm 56, the plate spring 66 is mounted between the securing pin 68b and one side edge of one end portion of the link arm 56. In this state, the inside edge of the cut-away portion 67 formed in one end portion of the link arm 56 remains elastically contacted with the peripheral surface of the leading-end-side securing pin 68a due to the elasticity of the pressure piece 70, thereby being able to eliminate the shaky motion of the engaging portion 65. And, the shifting motion can be transmitted as it is between the link arm 56 and output rod 64. By the way, with respect to the engaging portion 71 between the other end portion of the link arm 56 and one end portion (in FIG. 6, the upper end portion) of the sleeve 14 as well, although not shown, there is provided a similar shaky motion preventive mechanism to the engaging portion 65.

Figure 10:
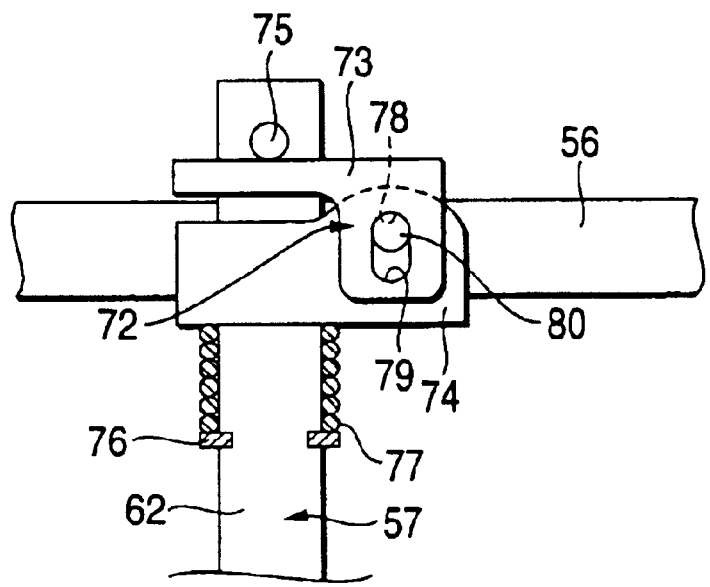
FIG. 10 is a view corresponding to the B portion shown in FIG. 6, showing a structure for preventing the shaky motion of an engaging portion between a link arm for shifting a sleeve constituting a control valve and a spool of a differential pressure cylinder.
Figure 11:
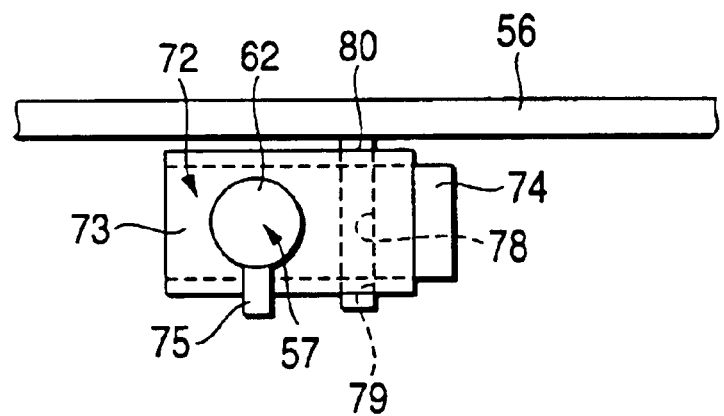
FIG. 11 is a view of the above structure when it is viewed from above FIG. 10.

Also, in the case of the engaging portion 72 between the middle portion of the link arm 56 and the leading end portion of the spool 62 constituting the differential pressure cylinder 57, there is prevented the shaky motion by using such a structure as shown in FIGS. 10 and 11. That is, with the outer surface of the leading end portion of the spool 62, there are fitted a pair of slide members 73, 74 in such a manner that they can be shifted in the axial direction of the spool 62 and can be prevented from being inclined due to a moment load. Also, at the positions where the two slide members 73, 74 are held by the leading end portion and middle portion of the spool 62, there are secured and fixed a stop pin 75 and a retaining ring 76. And, between the retaining ring 76 and slide member 74, there is interposed a compression coil spring 77 which is an elastic member; and, the compression coil spring 77 is elastically pressed against the slide member 74 and the other slide member 73 in their mutually approaching directions.

Also, in such positions, where the two slide members 73, 74 are matched to each other and also which are shifted from the leading end portion of the spool 62, there are formed through holes 78, 79, respectively. And, a pivotally supporting pin 80, which is projectingly disposed on the side surface of the link arm 56, is inserted through the two through holes 78, 79. In the illustrated embodiment, the through hole 78, which is formed in the slide member 74 situated on the lower side in FIG. 10, is formed as a circular hole having an inside diameter slightly larger than the outside diameter of the pivotally supporting pin 80. On the other hand, the through hole 79 formed in the slide member 73 situated on the upper side in FIG. 10 is formed as an elongated hole which is long in the axial direction of the spool 62. In a state where the pivotally supporting pin 80 is inserted through the thus-formed through holes 78, 79, in case where an elastic force is applied to the two slide members 73, 74 in their mutually approaching directions using the compression spring coil 77, the pivotally supporting pin 80 is elastically held by and between the mutually opposite-side inner surfaces of the two through holes 73, 74. When changing the transmission ratio of the toroidal-type continuously variable transmission unit 22, the link arm 56 is swung and shifted about the pivotally supporting pin 80; however, in the swinging and shifting motion of the link arm 56, the engaging portion 72 between the middle portion of the link arm 56 and the leading end portion of the spool 62 is prevented from shaking.

With employment of the structure shown in FIGS. 8 to 11, the three engaging portions respectively between the link arm 56 and the leading end portion of the output rod 64 of the stepping motor 13, between the link arm 56 and the leading end portion of the spool 62 constituting the differential pressure cylinder 57, and between the link arm 56 and the end portion of the sleeve 14 constituting the transmission ration control valve 12 can be prevented from shaking. And, the shifting movements of the output rod 64 and spool 62 can be transmitted to the sleeve 14 accurately. As a result of this, simply by restricting the shifting movements of the output rod 64 and spool 62 accurately, the shifting motion of the sleeve 14 and thus the transmission ratio of the toroidal-type continuously variable transmission unit 22 can be restricted accurately. And, also when increasing extremely the transmission ratio of a continuously variable transmission apparatus of a geared neutral type into which the toroidal-type continuously variable transmission unit 22 is incorporated, the direction and magnitude of the torque to be transmitted to the output shaft 50 of the continuously variable transmission apparatus can be set in a desired manner. By the way, in the embodiment shown in FIGS. 10 and 11, the pivotally supporting pin 80 is disposed at a position which is shifted from the spool 62. On the other hand, in case where the diameter of the spool 62 is sufficiently large, in the leading end portion of the spool 62, there can be formed a through hole which penetrates through the spool 62 in the diameter direction thereof, and the pivotally supporting pin 80 can be inserted into this through hole. In this case, the two slide members 73, 74 are respectively secured to such portions of the two end portions of the pivotally supporting pin 80 that project from the outer peripheral surface of the leading end portion of the spool 62.

By the way, in the case of the above-mentioned three engaging portions, preferably, there may be mounted an elastic member on each of them to thereby prevent them against shaky motion. However, even in case where an elastic member is mounted on one or two of the three engaging portions, there can be obtained a good effect when compared with a case in which no elastic member is used at all.

Also, to restrict the transmission ratio of the toroidal-type continuously variable transmission unit 22 accurately, the respective engaging portions may be interference fitted to such a degree that they can be prevented from shaking, or they may be precision fitted in a state where each of them has such a slight clearance that does not have any ill influence on the transmission ratio control. However, to allow such precision fit, the working precision of the respective members must be enhanced, which results in an increase in the manufacturing costs of the members. Also, there is a possibility that, when the members are used for a long period of time, they can be worn slightly; and, such slight wear causes the engaging portions to make such a shaking movement that can have an ill effect on the transmission ratio control. On the other hand, according to the structure shown in FIGS. 8 to 11, while being able to prevent an increase in the costs, the transmission ratio of the toroidal-type continuously variable transmission unit 22 can be restricted accurately over the long term. By the way, as a preferred embodiment, there may be employed an embodiment in which, while the respective engaging portions are fitted with such a degree of precision that does not increase the costs greatly, the structure shown in FIGS. 8 to 11 is added.

Further, in order to restrict the transmission ratio of the toroidal-type continuously variable transmission unit 22 accurately, the shaky motion of a link mechanism between the precess cam 18 and the spool 15 of the transmission ratio control valve 12 must also be eliminated. For this purpose, in the illustrated embodiment, as shown in FIG. 6 which has been previously discussed, between a retaining ring 81 secured to the middle portion of the spool 15 and a seat plate 83 butted against a valve body 82, there is interposed a compression coil spring 84. And, due to the elastic force of the compression coil spring 84, there are eliminated a clearance in the engaging portion between the spool 15 and link arm 19a as well as a clearance in the engaging portion between the link arm 19a and precess cam 18. In other words, due to the elastic force of the compression coil spring 84, the respective engaging portions are elastically contacted. By the way, the elastic force of the compression coil spring 84 is small and is supported by the valve body 82; and, therefore, there is no possibility that the elastic force can be transmitted up to the sleeve 14. Also, there is no fear that the precess cam 18 can be shifted due to the elastic force of the compression coil spring 84. This avoids the possibility that the elastic force of the compression coil spring 84 can have an ill influence on the control of the transmission ratio of the toroidal-type continuously variable transmission unit 22.

Next, description will be given below of a more specific oil pressure control circuit with reference to FIG. 12. The oil pressure control circuit shown in FIG. 12 has a function which, when an electric control circuit is at faulty, can turn the torque to be transmitted to the output shaft 50 (see FIG. 1) into such a level as allows the car to run at a low speed (that is, can secure the necessary and minimum torque), and a function to make proper the quantity of lubricating oil (traction oil) to be supplied to the respective parts. Of the two functions, the necessary and minimum torque securing function is a function to allow the car, which is broken down on a road, to be moved to a safe place such as the shoulder of the road.

Figure 12:
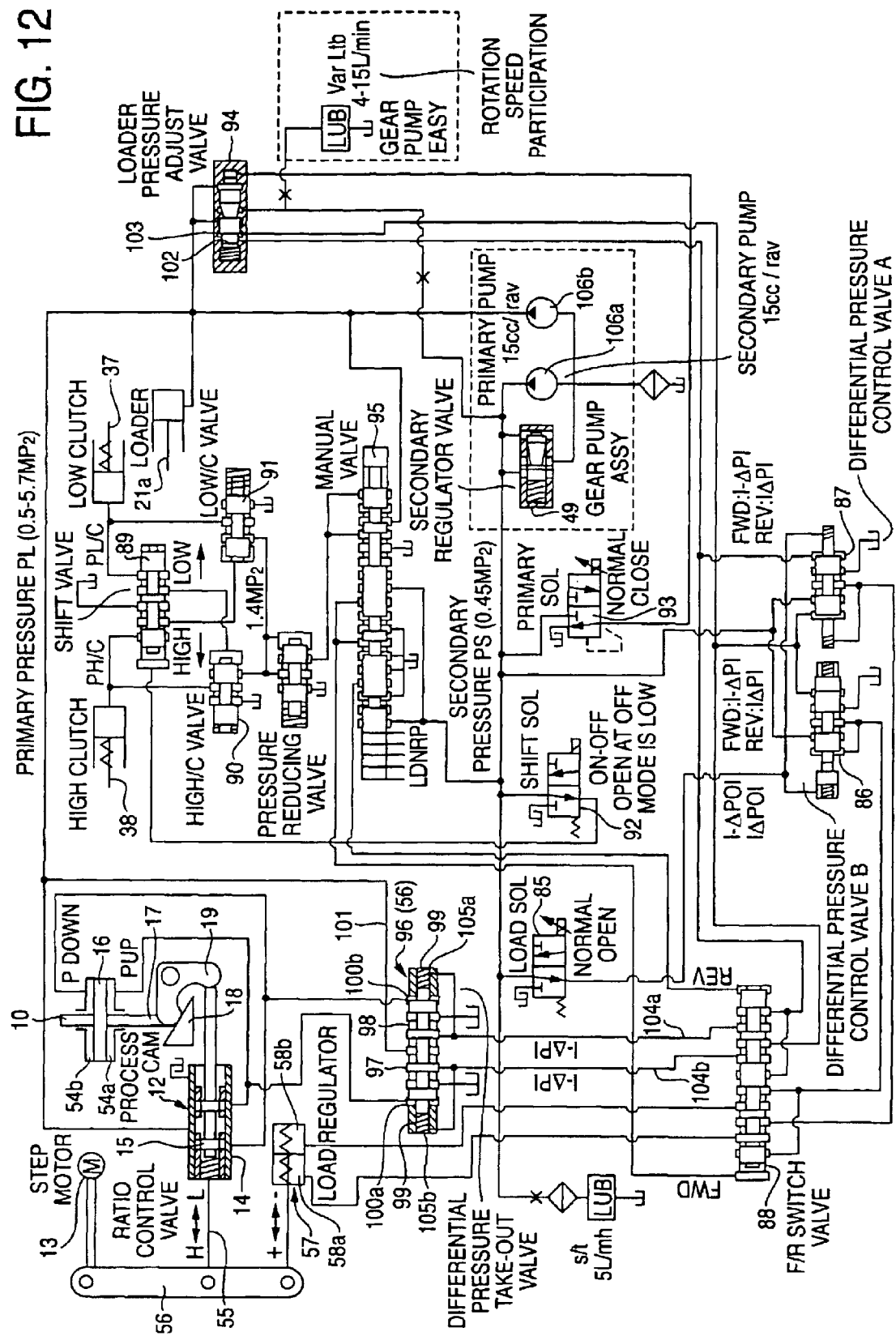
FIG. 12 is an oil pressure circuit diagram, showing a more specific control unit.

In the case of the oil pressure control circuit shown in FIG. 12 having the above functions, the pressure oil is supplied to the differential pressure cylinder 57 through an advancing/backing switch valve 88 by first and second pressure difference control valves 86, 87 which can be controlled by a load electromagnetic valve 85. By the way, the load electromagnetic valve 85 is an electromagnetic proportional valve of a normally open type, and it has a function to introduce the oil pressure almost proportional to the voltage applied into the first and second pressure difference control valves 86, 87 respectively existing on the downstream side. Also, supply of the pressure oil to the low-speed and high-speed clutches 37, 38 is carried out using a shifting switch valve 89, high-speed and low-speeds witch valves 90, 91, and a shifting electromagnetic valve 92 of a normally open type. Also, the valve opening pressure of a pressurizing pressure adjust valve 94 can be adjusted in accordance with the opening and closing of an electromagnetic valve 93 of a normally closed type. Further, the communicating conditions of the respective parts can be switched using a manually-operated switch valve 95 which can be operated by a shift lever disposed in a driver's seat.

A difference between oil pressures within the pair of oil pressure chambers 54a, 54b disposed in the actuator 10 used to shift the trunnion 7 (see FIGS. 14 and 15) is taken out by a pressure difference take-out valve 96 (which corresponds to the correcting control valve 59 in FIG. 5) and is introduced into the pressurizing pressure adjust valve 94. On the pressure difference take-out valve 96, there are disposed a pair of springs 99, 99 and a pair of pilot portions 100a, 100b with a spool 98 between them; the spool 98 is fitted into a cylinder hole 97 including alternately arranged small-diameter and large-diameter portions in such a manner that the spool 98 can be shifted in the axial direction thereof. A plurality of collar portions formed in the spool 98 can be oil-tight fitted with the small-diameter portions of the cylinder hole 97. And, the pressure oil adjusted by the pressurizing pressure adjust valve 94 can be fed through a first pressure introduction passage 101 into the large-diameter portions existing in the central portion of the cylinder hole 97.

The spool 98 constituting the pressure difference take-out valve 96 can be shifted in the axial direction thereof according to the pressures which exist within the pair of oil pressure chambers 54a, 54b disposed in the actuator 10 with the piston 16 between them and also which are introduced into the pair of pilot portions 100a, 100b. And, the communicating states of the downstream end of the first pressure introduction passage 101 with first and second pilot portions 102, 103 belonging to the pressurizing pressure adjust valve 94 can be controlled through the advancing/backing switch valve 88. That is, the spool 98 constituting the pressure difference take-out valve 96 can be shifted in the axial direction thereof according to the difference between the oil pressures introduced into the pair of pilot portions 100a, 100b. And, depending on whether the oil pressure introduced into one pilot portion 100a (100b) of the two pilot portions is higher than the oil pressure introduced into the other pilot portion 100b (100a), the oil pressures are introduced into second pressure introduction passages 104a (104b) respectively having their end portions connected with the pressure difference take-out valve 96, and reaction force chambers 105a (105b) disposed in the portions that are opposed to the two end faces of the spool 98.

For example, let us assume a state in which the oil pressure within one oil pressure chamber 54a of the actuator 10 increases over the oil pressure within the other oil pressure chamber 54b. In this state, the oil pressure introduced into one pilot portion 100a is higher than the oil pressure introduced into the other pilot portion 100b and thus the spool 98 is moved to the right in FIG. 12, thereby switching the state of the pressure difference take-out valve 96. As a result of this, the pressure oil fed through the first pressure introduction passage 101 is introduced through one (in FIG. 12, the right) second pressure introduction passage 104a into the first pilot portion 102 of the pressurizing pressure adjust valve 94. By the way, at the same time, the present pressure oil is introduced into the first and second pressure difference control valves 86, 87 to thereby shift the differential pressure cylinder 57 through the advancing/backing switch valve 88, so that the sleeve 14 of the transmission ratio control valve 12 can be shifted slightly.

On the other hand, in case where the oil pressure within the other oil pressure chamber 54b of the actuator 10 increases over the oil pressure within one oil pressure chamber 54a, the oil pressure introduced into the other pilot portion 100b is higher than the oil pressure introduced into one pilot portion 100a and thus the spool 98 is moved to the left in FIG. 12, thereby switching the pressure difference take-out valve 96 over to the reversed state to the above state. As a result of this, the pressure oil fed through the first pressure introduction passage 101 is introduced through the other (in FIG. 12, the left) second pressure introduction passage 104b into the second pilot portion 103 of the pressurizing pressure adjust valve 94. Also, at the same time, the present pressure oil is introduced into the first and second pressure difference control valves 86, 87 to thereby shift the differential pressure cylinder 57 through the advancing/backing switch valve 88.

In both cases, the pressure oil, which is introduced into the second pressure introduction passages 104a, 104b, is introduced into the reaction force chambers 105a (105b) of the pressure difference take-out valve 96 as well, thereby pressing against the axial-direction end face of the spool 98. Therefore, a force, which shifts the spool 98 in the axial direction to bring the first pressure introduction passage 101 into communication with the second pressure introduction passages 104a (104b), is proportional to a difference $|\Delta P|$ between the oil pressures introduced into the pair of pilot portions 100a, 100b disposed in the pressure difference take-out valve 96. As a result of this, the oil pressures introduced into the first and second pilot portions 102, 103 of the pressurizing pressure adjust valve 94 are proportional to a difference $|\Delta P|$ between the oil pressures existing within the oil pressure chambers 54a, 54b of the actuator 10, that is, the power that passes through the toroidal-type continuously variable transmission unit 22 (see FIG. 1).

Figure 13:
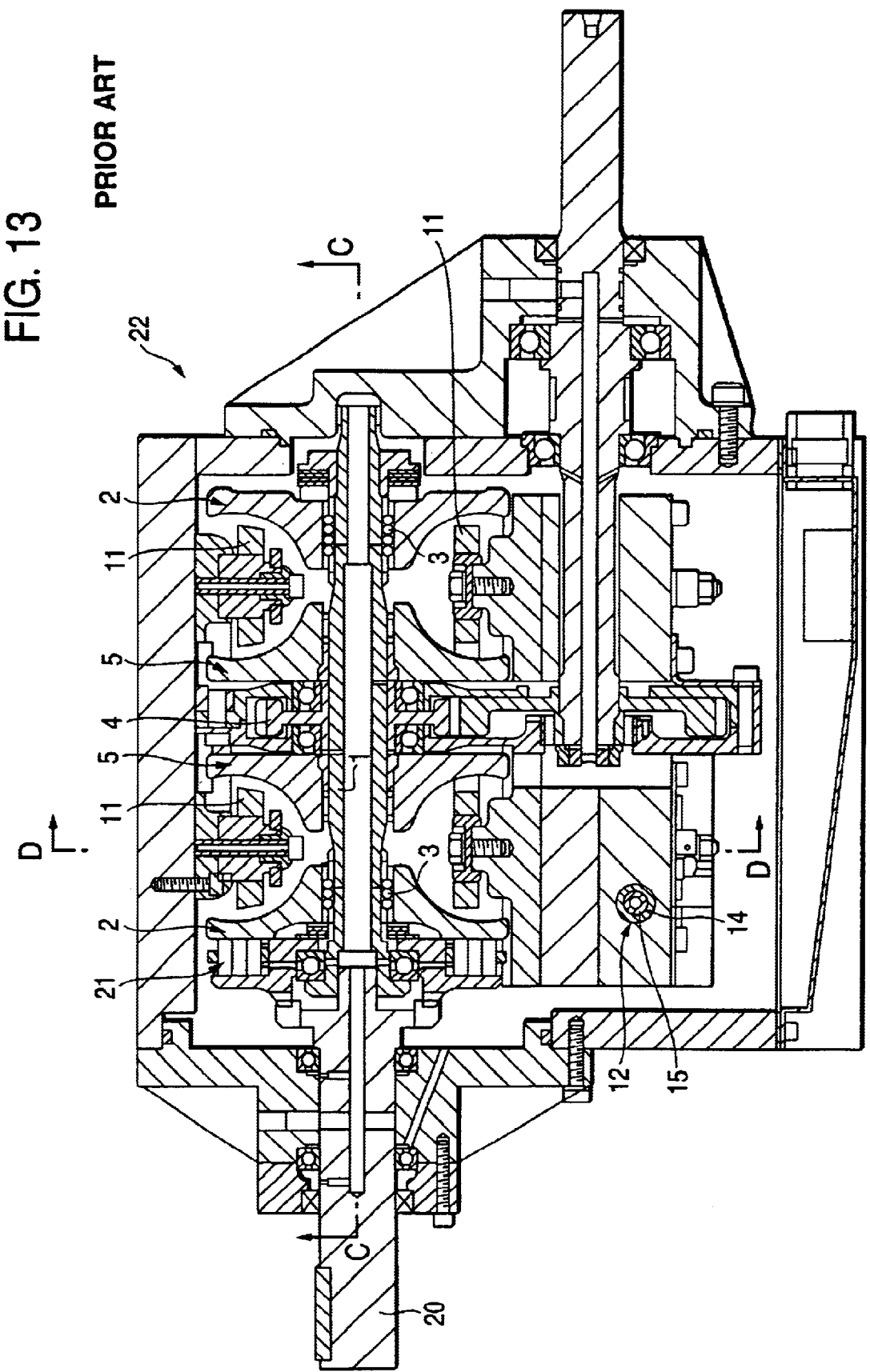
FIG. 13 is a section view of an example of a conventionally known toroidal-type continuously variable transmission unit.

The valve opening pressure of the pressurizing pressure adjust valve 94 increases as the oil pressures introduced into the first and second pilot portions 102, 103 increase; and, the oil pressure introduced into a pressing device 21a of an oil pressure type disposed instead of the pressing device 21 of a mechanical type (see FIGS. 13, 14 and 16) increases as the valve opening pressure of the pressurizing pressure adjust valve 94 increases. Therefore, the oil pressure introduced into the pressing device 21a and thus a pressing force to be generated by the pressing device 21a increases as the power passing through the toroidal-type continuously variable transmission increases. And, at the same time, the quantity of lubricating oil to be jetted out from the pressurizing pressure adjust valve 94 increases and thus the quantity of lubricating oil to be fed into the respective parts of the toroidal-type continuously variable transmission increases. Thus, it is possible to prevent wasteful use of the power for driving pumps 106a, 106b which are used to jet out the lubricating oil, thereby being able to enhance the efficiency of the whole of the continuously variable transmission apparatus.

Also, in the above-mentioned oil pressure control circuit, a fine adjustment of the shift amount of the spool 15 constituting the transmission ratio control valve 12 by the differential pressure cylinder 57 and thus a fine adjustment of the transmission ratio of the toroidal-type continuously variable transmission unit 22 can be made by controlling the electrically energizing state of the load electromagnetic valve 85 of a normally open type. Specifically, a controlling computer sets the target value of the torque to be transmitted to the output shaft 50 according to the various car conditions such as the opening angle of the accelerator, the position of a select bar (the switching position of the manually-operated switch valve 95), and the state of the brakes. And, as the target value is decreased, an application voltage to the load electromagnetic valve 85 is increased and the opening angle of the load electromagnetic valve 85 is decreased (that is, the moment while the valve 85 is opened is reduced), thereby reducing the oil pressure that is introduced into the first and second pressure difference control valves 86, 87. As a result of this, the oil pressure introduced into the differential pressure cylinder 57 through the first and second pressure difference control valves 86, 87 is reduced, so that the correction amount of the transmission ratio of the toroidal-type continuously variable transmission unit 22 by the differential pressure cylinder 57 is reduced accordingly. In this state, unless the spool 15 of the transmission ratio control valve 12 is shifted by the stepping motor 13, the torque to be transmitted to the output shaft 50 can be reduced (to such an insufficient level that cannot make the car run).

On the other hand, as the target value increases, the application voltage to the load electromagnetic valve 85 is decreased and the opening angle of the load electromagnetic valve 85 is increased (that is, the moment during the valve 85 is opened is increased), thereby raising the oil pressure that is introduced in to the first and second pressure difference control valves 86, 87 (for example, up to 0.45 MPa which is a line pressure). As a result of this, the oil pressure introduced into the differential pressure cylinder 57 through the first and second pressure difference control valves 86, 87 is increased, so that the correction amount of the transmission ratio of the toroidal-type continuously variable transmission unit 22 by the differential pressure cylinder 57 is increased accordingly. In this state, even in case where the spool 15 of the transmission ratio control valve 12 is not shifted by the stepping motor 13, the torque to be transmitted to the output shaft 50 can be increased to such a sufficient level that allows the car to run unless the driver steps down the brake pedals or the parking brakes are put into operation.

In the present embodiment, since there is used a load electromagnetic valve of a normally open type is used as the load electromagnetic valve 85, in case where electric energization to the load electromagnetic valve 85 is cut off due to the faulty electric control circuit (that is, the application voltage becomes zero), the oil pressure introduced into the differential pressure cylinder 57 provides the maximum value, so that the correction amount of the transmission ratio of the toroidal-type continuously variable transmission unit 22 by the differential pressure cylinder 57 provides the maximum value. As a result of this, when the electric control circuit is at fault, the torque to be transmitted to the output shaft 50 can be increased to such a level that allows the car to run at a low speed. And, the car, which is broken down on a road, can be moved to a safe place such as the shoulder of the road. In other words, when the electric control circuit is faulty, in case where the manually-operated switch valve 95 is switched over to a running state (a D range or an R range), such a torque that allows the car to run at a low speed can be applied to the output shaft 50. By the way, in this case, preferably, the occurrence of the car break-down may be noticed to the driver through a warning lamp or a warning buzzer disposed on a dashboard in front of the driver's seat to thereby prevent the driver from carrying out any other running operations than the necessary and minimum operation for guiding the car into the safe place.

Since the invention is structured and operated in the above-mentioned manner, the torque passing through the toroidal-type continuously variable transmission unit constituting the continuously variable transmission apparatus can be restricted strictly to a desired value. Thanks to this, not only the sufficient durability of the toroidal-type continuously variable transmission unit can be secured but also the driving operation of a car incorporating therein the above-mentioned continuously variable transmission apparatus can be executed in a stable manner.

What is claimed is:

1. A control apparatus for controlling transmission ratio of a toroidal-type continuously variable transmission unit of a continuously variable transmission apparatus, the continuously variable transmission apparatus, comprising:

a toroidal-type continuously variable transmission unit including: an input shaft driven and rotated by a drive source; an output shaft; at least a pair of disks supported so as to be relatively rotated with respect to each other and concentric with each other; a plurality of power rollers held between the pair of disks; a plurality of trunnions rotatably supporting the power rollers; and a hydraulic actuator including a pair of oil pressure chambers and causing each of the trunnions to generate a force proportional to a difference between oil pressures within the pair of oil pressure chambers, the toroidal-type continuously variable transmission unit changing a transmission ratio between the pair of disks by shifting the trunnions in the axial direction of pivot shafts as the swing centers of the respective trunnions by using the actuator; and, a differential gear unit including a combination of a plurality of gears, wherein relative shifting speeds between the plurality of gears of the differential unit are changed by adjusting the transmission ratio of the toroidal-type continuously variable transmission unit, thereby the continuously variable transmission apparatus switches the rotation state of the output shaft over between a forward rotation state and a backward rotation state with a stop state between them while rotating the input shaft in one direction by the drive source, and the control apparatus comprising:

rotation speed control unit for controlling the rotation speed of the drive source;

transmission ratio setting unit for setting the transmission ratio of the toroidal-type continuously variable transmission unit in order to coincide the rotation speed of the input shaft of the continuously variable transmission apparatus with the controlled rotation speed of the drive source;

oil pressure measuring unit for measuring a pressure difference between the oil pressures of the pair of oil pressure chambers of the actuator; and, transmission ratio correcting unit operating in response to a deviation of a torque between a measured value by the oil pressure measuring unit and a target value of a torque passing through the toroidal-type continuously variable transmission unit, and adjusting the transmission ratio of the toroidal-type continuously variable transmission unit so as to eliminate the deviation.

2. The control apparatus according to claim 1, wherein, when an actual measured value of a torque actually passing through the toroidal-type continuously variable transmission unit has a deviation with respect to the target value of the torque and in a direction in such a manner that an input-shaft-side disk of the pair of disks applies a torque to the power rollers, the transmission ratio correcting unit changes the transmission ratio of the toroidal-type continuously variable transmission unit to a speed reducing side, and when an actual measured value of the torque has a deviation with respect to the target value of the torque and in a direction in such a manner that the input-shaft-side disk receives a torque from the power rollers, the transmission ratio correcting unit changes the transmission ratio of the toroidal-type continuously variable transmission unit to an speed increasing side.

3. The control apparatus according to claim 1, wherein an upper limit of a set value of the transmission ratio of the toroidal-type continuously variable transmission unit set by the transmission ratio setting unit is set to the amount corrected in accordance with a deviation between the measured value and the target value of the pressure difference.

4. The control apparatus according to claim 1, further comprising:

an electric control circuit for setting the transmission ratio of the toroidal-type continuously variable transmission unit and a target value of a pressure difference based on the target value of a torque passing through the toroidal-type continuously variable transmission unit; and, a hydraulic control circuit for calculating a deviation between the target value and the measured value of the pressure difference by comparing the target value with the measured value and correcting the transmission ratio of the toroidal-type continuously variable transmission unit based on the deviation.

5. The control apparatus according to claim 4, further comprising:

a stepping motor for setting the transmission ratio of the toroidal-type continuously variable transmission unit;

a differential pressure cylinder for correcting the transmission ratio of the toroidal-type continuously variable transmission unit;

a transmission ratio control valve for switching the supply of an oil pressure to the actuator for shifting the trunnions in the axial direction of the pivot shafts; and, a link arm for connecting together an output portion of the stepping motor, an output portion of the differential pressure cylinder, and the transmission ratio control valve.

6. The control apparatus according to claim 5, wherein the transmission ratio control valve is interposed between the stepping motor and the differential pressure cylinder.

7. The control apparatus according to claim 5, wherein the differential pressure cylinder is interposed between the stepping motor and the transmission ratio control valve.

8. The control apparatus according to claim 7, wherein the stepping motor is disposed downward of the differential unit of the gear type.

9. The control apparatus according to claim 5, wherein an elastic member is mounted on at least one of a connecting portion between the link arm and the output portion of the stepping motor, a connecting portion between the link arm and the output portion of the differential pressure cylinder, and a connecting portion between the link arm and the transmission ratio control valve.

10. The control apparatus according to claim 9, wherein the elastic member is a plate spring made of metal, the link arm includes a cut-away portion formed in an end portion thereof, a securing pin projected from the output portion of the stepping motor or the differential pressure cylinder or projected from the transmission ratio control valve is engaged into the cut-away portion of the link arm, and a metal spring secured to the output portion presses against the end portion of the link arm to thereby bring the inside edge of the cut-away portion into elastic contact with the outer peripheral surface of the securing pin.

11. The control apparatus according to claim 9, wherein the elastic member is a compression coil spring made of metal, a pair of slide members are fitted with the outer surface of the output portion of the stepping motor or the output portion of the differential pressure cylinder or the transmission ratio control valve so as to be shifted in the axial direction thereof, the pair of slide members respectively include through holes formed in mutually matched portions thereof, a pivotally supporting pin is projectingly provided on the side surface of a middle portion of the link arm and is inserted through the through holes of the pair of slide members, and the compression coil spring presses against the pair of slide members in approaching directions to each other to thereby hold the pivotally supporting pin elastically between the respective inner peripheral surfaces of the through holes formed in the two slide members.

12. The control apparatus according to claim 4, wherein, when the electric control circuit is at fault, the target value of the torque passing through the toroidal-type continuously variable transmission unit and transmitted to the output shaft is set to a maximum value within a restricted range.

13. A control method for controlling transmission ratio of a toroidal-type continuously variable transmission unit of a continuously variable transmission apparatus, the continuously variable transmission apparatus, comprising:

a toroidal-type continuously variable transmission unit including: an input shaft driven and rotated by a drive source; an output shaft; at least a pair of disks supported so as to be relatively rotated with respect to each other and concentric with each other; a plurality of power rollers held between the pair of disks; a plurality of trunnions rotatably supporting the power rollers; and a hydraulic actuator including a pair of oil pressure chambers and causing each of the trunnions to generate a force proportional to a difference between oil pressures within the pair of oil pressure chambers, the toroidal-type continuously variable transmission unit changing a transmission ratio between the pair of disks by shifting the trunnions in the axial direction of pivot shafts as the swing centers of the respective trunnions by using the actuator; and, a differential unit of a gear type including a combination of a plurality of gears, wherein relative shifting speeds between the plurality of gears of the differential unit are changed by adjusting the transmission ratio of the toroidal-type continuously variable transmission unit, thereby the continuously variable transmission apparatus switches the rotation state of the output shaft over between a forward rotation state and a backward rotation state with a stop state between them while rotating the input shaft in one direction by the drive source, and the control method, for controlling a torque passing through the toroidal-type continuously variable transmission unit to a target value, comprising steps of:

controlling the rotation speed of the drive source;

setting the transmission ratio of the toroidal-type continuously variable transmission unit at a value necessary to coincide the rotation speed of the input shaft of the continuously variable transmission apparatus with the controlled rotation speed of the drive source;

measuring a pressure difference between the oil pressures of the pair of oil pressure chambers of the actuator to thereby measure a torque actually passing through the toroidal-type continuously variable transmission unit, calculating a deviation of the torque actually passing through the toroidal-type continuously variable transmission unit with respect to the target value based on the measured an the target value of the torque, and adjusting the transmission ratio of the toroidal-type continuously variable transmission unit so as to eliminate the deviation.

14. The control method according to claim 13, wherein, in the range where the torque passing through the toroidal-type continuously variable transmission unit is restricted within the target value, the torque of the drive source for driving the input shaft is changed in a decreasing direction as the rotation speed of the input shaft increases, and when the measured value of the torque actually passing through the toroidal-type continuously variable transmission unit has a deviation with respect to the target value and in a direction where the input-shaft-side disk applies a torque to the power rollers, the toroidal-type continuously variable transmission unit is changed to a speed reducing side, and when the measured value has a deviation with respect to the target value and in a direction where the input-shaft-side disk receives a torque from the power rollers, the toroidal-type continuously variable transmission unit is changed to a speed increasing side.

15. The control method according to claim 13, wherein an upper limit of a set value of the transmission ratio of the toroidal-type continuously variable transmission unit necessary to make the torque passing through the toroidal-type continuously variable transmission unit approach the target value is set to an amount calcalated based on a deviation between measured and target values of the pressure difference.

16. The control method according to claim 13, wherein the setting the transmission ratio of the toroidal-type continuously variable transmission unit necessary to restrict the torque passing through the toroidal-type continuously variable transmission unit to a target value and the target value of the pressure difference based on the torque target value are electrically executed, and the calculating a deviation between the target value and the measured value of the torque by comparing the target value with the measured value, and correcting the transmission ratio of the toroidal-type continuously variable transmission unit based on the deviation are hydraulically executed.

* * * * *